(12) United States Patent
Glicksman

(10) Patent No.: US 12,067,896 B2
(45) Date of Patent: *Aug. 20, 2024

(54) BREAST AND ABDOMINAL AUGMENTATION AND RECONSTRUCTION TEACHING MODEL

(71) Applicant: Caroline A. Glicksman, Brielle, NJ (US)

(72) Inventor: Caroline A. Glicksman, Brielle, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,771

(22) Filed: Apr. 24, 2023

(65) Prior Publication Data

US 2023/0260428 A1  Aug. 17, 2023

Related U.S. Application Data

(63) Continuation of application No. 16/428,878, filed on May 31, 2019, now Pat. No. 11,636,782.

(51) Int. Cl.
*G09B 23/30* (2006.01)
*G09B 23/28* (2006.01)

(52) U.S. Cl.
CPC ........... *G09B 23/30* (2013.01); *G09B 23/285* (2013.01)

(58) Field of Classification Search
CPC ................................ G09B 23/28; G09B 23/30
USPC ........................................................ 434/273
See application file for complete search history.

(56) References Cited

U.S. PATENT DOCUMENTS

| | | | | |
|---|---|---|---|---|
| 2,678,505 A | * | 5/1954 | Munson ................. | G09B 23/34 446/385 |
| 4,439,162 A | * | 3/1984 | Blaine .................... | G09B 23/34 434/273 |
| 4,828,559 A | * | 5/1989 | Greenberg ................ | A61F 2/52 623/7 |
| 5,098,330 A | * | 3/1992 | Greenberg ............... | A41C 3/10 450/55 |
| 5,356,295 A | * | 10/1994 | Grosz .................... | G09B 23/30 434/272 |
| 6,048,252 A | * | 4/2000 | Sebring .................. | A41C 3/148 450/23 |
| 2005/0079475 A1 | * | 4/2005 | Haque .................... | G09B 23/30 434/273 |
| 2006/0030939 A1 | * | 2/2006 | Frank ....................... | A61F 2/12 623/8 |

(Continued)

*Primary Examiner* — Kurt Fernstrom
(74) *Attorney, Agent, or Firm* — Hinckley, Allen & Snyder; Stephen Holmes

(57) ABSTRACT

An anatomical teaching model is used to demonstrate principles of breast and/or abdominal surgical procedures. The model may include a torso, a pectoralis major muscle piece attachable to the chest wall surface, and a breast tissue piece that is positionable over the pectoralis major muscle piece. The model may further include a pair of rectus muscle pieces attachable to the abdominal wall surface and an abdominal tissue piece positionable over the pair of rectus muscle pieces. The pair of rectus muscle pieces have two sections of material positionable symmetrically about a sagittal plane of the female-shaped torso. The model may further include a capsule pocket configured to be inserted between the pectoralis major muscle piece and the chest wall surface, the capsule pocket having an opening for insertion of an implant.

13 Claims, 15 Drawing Sheets

(56) References Cited

U.S. PATENT DOCUMENTS

| | | | |
|---|---|---|---|
| 2006/0127868 A1* | 6/2006 | Winslow | G09B 23/30 434/273 |
| 2007/0003917 A1* | 1/2007 | Kitching | G09B 23/32 434/262 |
| 2008/0138781 A1* | 6/2008 | Pellegrin | G09B 23/34 434/274 |
| 2009/0081627 A1* | 3/2009 | Ambrozio | G09B 23/34 434/267 |
| 2009/0208915 A1* | 8/2009 | Pugh | G09B 23/30 434/270 |
| 2010/0209899 A1* | 8/2010 | Park | G09B 23/34 434/272 |
| 2011/0053132 A1* | 3/2011 | Glicksman | G09B 23/34 434/267 |
| 2012/0015337 A1* | 1/2012 | Hendrickson | G09B 23/30 434/267 |
| 2012/0034587 A1* | 2/2012 | Toly | G09B 23/30 434/267 |
| 2012/0214144 A1* | 8/2012 | Trotta | G09B 23/30 434/267 |
| 2012/0264097 A1* | 10/2012 | Newcott | G09B 23/30 434/267 |
| 2012/0288839 A1* | 11/2012 | Crabtree | B65D 75/5883 434/267 |
| 2014/0011172 A1* | 1/2014 | Lowe | G09B 23/288 434/273 |
| 2014/0272879 A1* | 9/2014 | Shim | G09B 23/32 434/272 |
| 2015/0004584 A1* | 1/2015 | Galibois | G09B 23/303 434/270 |
| 2017/0263160 A1* | 9/2017 | Hose | G09B 23/30 |

* cited by examiner

BREAST AND ABDOMINAL AUGMENTATION AND RECONSTRUCTION TEACHING MODEL

CROSS-REFERENCE TO RELATED APPLICATIONS

This application is a continuation of U.S. patent application Ser. No. 16/428,878, filed May 31, 2019, now U.S. patent Ser. No. 11/636,782, issued Apr. 25, 2023.

TECHNICAL FIELD

The present disclosure relates generally to models and mannequins used in the field of medicine. More specifically, the present disclosure relates to models and mannequins used in the field of medicine to teach anatomic body structure and demonstrate or simulate surgical procedures and techniques.

BACKGROUND OF THE DISCLOSURE

An estimated 13-20 million women worldwide have undergone breast augmentation surgery in the last 40 years. In 2017 alone, there were over 300,000 breast augmentations and 129,000 breast reconstructions performed in the United States. In addition to the initial surgery, approximately 25% of breast augmentation patients will undergo an implant revision procedure within three years after having the initial surgery.

Reconstructive surgery to reconstruct the breast after a mastectomy can be performed using a breast implant, or by the use of autologous tissue harvested from the abdomen to reconstruct the absent breast or breasts. An abdominoplasty is a routine aesthetic procedure performed most often after multiple pregnancies or massive weight loss, and removes excess skin and repairs a diastasis of the rectus muscles. The American Society of Plastic Surgeons reported 129,753 abdominoplasty procedures were performed in 2017 and an estimated 500,000 hernia procedures performed.

As augmentation surgery is a cosmetic procedure, it is important that the patient be satisfied with the final outcome of their surgery. As a result, during the course of patient education, the physician attempts to provide as much information as possible to the patient regarding the specific procedures and outcomes in order for the patient to better make informed consent about the treatment. It is a known practice to use models to educate patients about the anatomic structures involved so that the patient can better understand the variety of treatment options. In addition, models can be utilized in physician education programs to teach the basic core principles of breast augmentation, revision of breast augmentation complications, and breast reconstruction with either devices or autologous reconstruction. Abdominoplasty procedures, including the repair of abdominal wall hernias, diastasis recti, and breast reconstruction using abdominal wall tissue can all be demonstrated effectively using models.

To obtain a satisfactory result, understanding and visualizing the final shape and position of the breast on the chest wall is critical to the patient who may be undergoing a breast augmentation or reconstruction. Visual demonstrations of the size of implants, positioning of implants, and the resulting appearance are critical. However, there is a lack of teaching models that are specifically designed to visually demonstrate the underlying anatomical structures of the chest wall, the variable pockets that may be created to receive the implants for augmentation and reconstruction, as well as breast implant complications.

Further common surgical procedures involve surgery to the abdomen. In some instances of breast augmentation or reconstruction the breast is accessed via the abdomen. That is, in some instances fat and/or tissue may be transferred to the breast via the chest cavity. In other instances, patients may need direct surgery to the abdomen such as a tummy tuck or repairing a condition such as a diastasis or a hernia.

Current educational tools available on the market include video, as well as other visual learning tools available on the market, including photos, and drawings. However, due to the wide variation in preferred learning methods, in order to fully understand the procedures they will be undertaking, some patients may need to observe or simulate the surgical procedures on actual 3-Dimensional (3-D) model that can demonstrate their specific or individualized procedure or complication.

Accordingly, there is a need in the field for a (3-D) teaching or demonstration model to show the process and finished appearance of breast augmentation and reconstruction, as well as to clearly demonstrate breast implant and chest surgery complications, including, but not limited to, implant malposition, rotation of shaped devices, double bubble deformities and asymmetries. Breast reconstruction methods that utilize the patient's own abdominal tissues, as well as repair of weaknesses of the abdominal wall, are equally difficult to explain to patients and their families.

SUMMARY OF THE DISCLOSURE

In accordance with various embodiments of the present disclosure, an anatomical teaching model can be used for demonstrating or simulating and teaching principles of breast and/or abdominal surgical procedures. The breast and abdominal augmentation and reconstruction teaching model ("teaching model") can be designed as an educational tool to enhance the hands on teaching of plastic surgery residents, and young plastic surgeons. In addition, it advantageously provides a visual three-dimensional anatomic model for use during patient consultations for procedures including, but not limited to breast augmentation, breast reconstruction, breast implant revision or corrective procedures, breast reconstruction using autologous tissue from the abdomen, fat transfer procedures, the repair of abdominal hernias and soft tissue defects, as well as abdominoplasty procedures.

The teaching model of the various embodiments described herein is an educational tool that helps create better informed and engaged patients during pre-operative, post-operative, and at every follow-up stage or visit for years to come. For these reasons, the present disclosure represents a significant advancement in the art, which has substantial commercial merit.

In some embodiments, the teaching model can include a female-shaped torso having a chest wall surface and an abdominal wall surface. Further, teaching model can also include a pectoralis major muscle piece that can be attachable to the chest wall surface and a breast tissue piece is positionable over the pectoralis major muscle piece.

In some embodiments, relative positions of the pectoralis major muscle piece and of the breast tissue piece are manipulable to permit a clinician to demonstrate or illustrate at least one of a female anatomy, a surgical procedure to the female anatomy, or a condition resulting from the surgical procedure.

Optionally, the teaching model can further include a pair of rectus muscle pieces attachable to the abdominal wall surface and an abdominal tissue piece positionable over the pair of rectus muscle pieces. The pair of rectus muscle pieces have two sections of material positionable symmetrically about a sagittal plane of the female-shaped torso. Relative positions of the pair of rectus muscle pieces and the abdominal tissue piece are manipulable to permit a clinician to demonstrate or illustrate at least one of a female anatomy, a surgical procedure to the female anatomy, or a condition prompting or resulting from the surgical procedure.

In accordance with some embodiments, the teaching model can include the female-shaped torso and the pair of rectus muscle pieces. The pair of rectus muscle pieces can be symmetrically disposed about a sagittal plane of the torso.

Optionally, the teaching model may further include an abdominal tissue piece attachable to the abdominal wall surface. The pair of rectus muscle pieces are attachable and the abdominal tissue piece are repositionable relative to one another on the female-shaped torso to demonstrate at least one of an anatomic condition or a surgical procedure.

In accordance with some embodiments of the present disclosure, methods of assembling an anatomical teaching model for demonstrating and teaching principles of breast and/or abdominal surgical procedures are also disclosed. Such methods can include providing a female-shaped torso including a chest wall surface and an abdominal wall surface, and removably attaching a pair of rectus muscle pieces over the abdominal wall surface. The pair of rectus muscle pieces have two sections of material positionable symmetrically about a sagittal plane of the torso.

The method can further include removably attaching an abdominal tissue piece to the pair of rectus muscle pieces. Relative positions of the pair of rectus muscle pieces and the abdominal tissue piece are manipulable to permit a clinician to demonstrate at least one of a female anatomy, a surgical procedure to the female anatomy, or a condition prompting or resulting from the surgical procedure.

Aspects and features of the teaching models and methods disclosed herein can be provided, excluded, or modified based on the teachings and disclosure herein.

BRIEF DESCRIPTION OF THE DRAWING FIGURES

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION OF EXEMPLARY EMBODIMENTS

Figure 1:
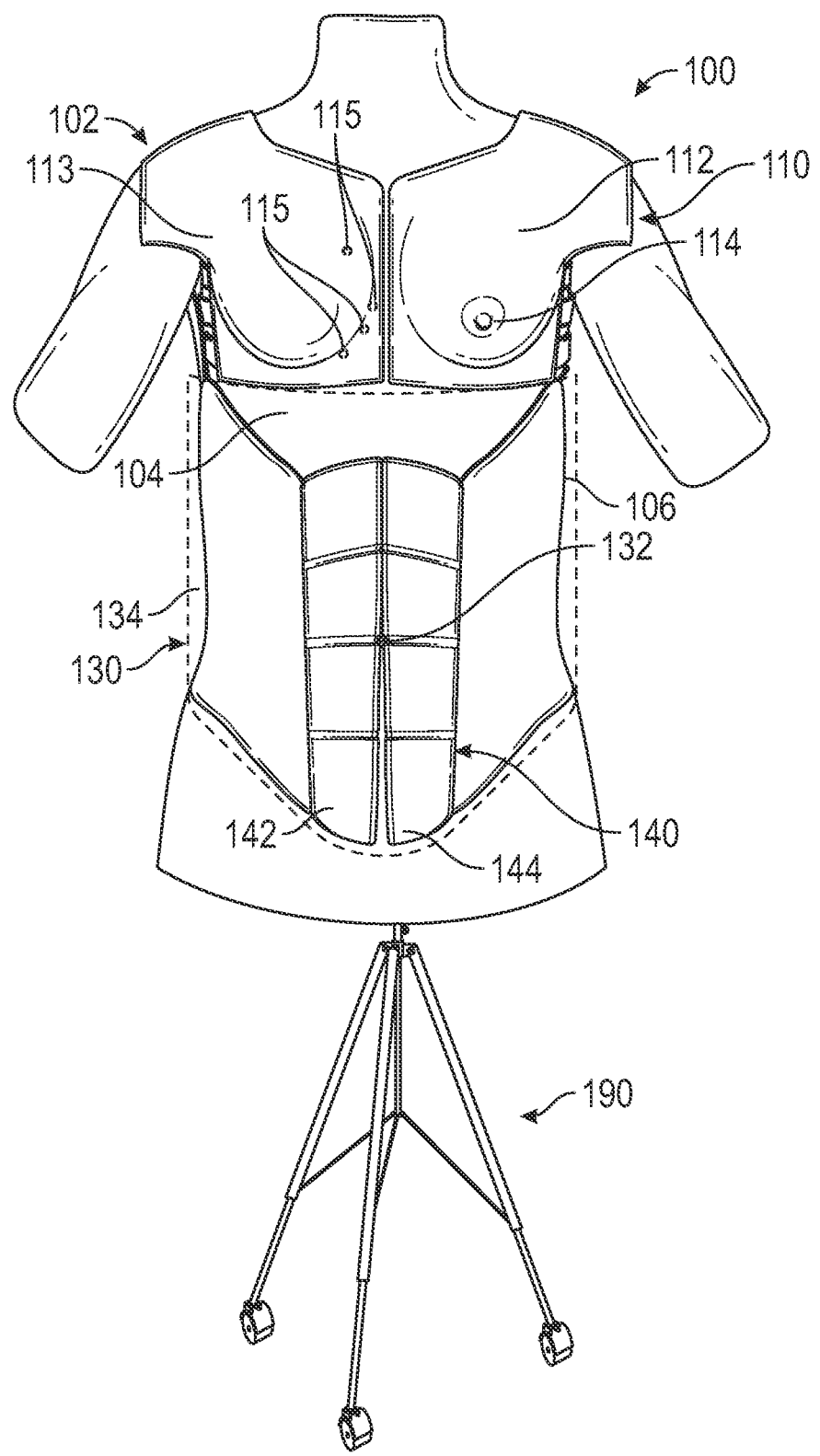
FIG. 1 is a front view of a breast and abdominal augmentation teaching model, in accordance with some embodiments of the present disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

The present disclosure provides a breast and abdominal augmentation and reconstruction teaching model that is believed to fill the existing void in the industry. The present description relates in general to models and mannequins used in the field of medicine. More specifically, the present disclosure relates to models and mannequins used in the field of medicine to teach, illustrate, demonstrate, or simulate anatomic body structure and related surgical procedures and techniques.

The present disclosure can incorporate features disclosed in Applicant's related U.S. Pat. No. 8,568,146, filed Sep. 2, 2010, the contents of which are incorporated herein by reference in their entirety.

In the present disclosure, the teaching model can comprise a life-size replica of a female torso, which can be placed on a stand or on a table. As presently designed, the chest wall of the torso can include a fabric outer surface onto which fasteners can be secured in varying locations. The fasteners and the materials that replicate the skin, soft tissues, breast parenchyma, and muscles of the chest and abdomen may be created out of fabric but could alternatively comprise a more lifelike or synthetic material.

The chest component of the teaching model is designed to be an anatomically correct replica including a female-shaped torso portion with a fabric chest wall, symmetrical pectoralis major muscle layers that can be secured to the chest wall with fasteners, and symmetrical breast tissue pieces that can be secured with fasteners over the pectoralis muscle layers. The muscle and breast tissue pieces can be made from fabric or other pliable materials.

For example, the muscle and breast tissue pieces may be composed of an elastic type fabric that molds and contours around an implant replicating the shape, position, and feel of a breast augmentation, breast reconstruction, or revision breast procedure. Alternately, a synthetic material may be used that may be more durable than the elastic-type of fabric. Available samples of actual breast implants may be utilized by the clinician to demonstrate the placement of the implants in various pockets, including subglandular or dual plane (partial submuscular) placements. The breast tissue, and muscle layers can be elevated to reveal the deeper tissue layers if desired.

In accordance with some embodiments, various fasteners may be used to removably attach the pectoralis major muscle layers to the torso at several positions including along the sternal border, clavicle and axilla. The fasteners may also be positioned along the anterior axillary line. The fasteners may attach the pectoralis major muscles superiorly along the clavicle, medially along the length of the sternum, and laterally in the superior axilla near the humeral head. In some embodiments, the inferior-lateral attachments are free, and not attached to the torso of the mannequin.

The breast tissue pieces may optionally include anterior and posterior fabric surfaces coupled to each other and filled with a batting material therebetween to represent the adult female breast. In some embodiments, the breast tissue pieces may include an anatomically correct nipple-areola. Similar to the muscle layers, various fasteners may be used to removably attach the breast tissue pieces to the torso at several positions.

In some embodiments, the teaching model may optionally include a strip or other piece of fabric attached to the torso at a position so as to represent the original or current inframammary fold. The fabric representing the inframammary fold may be attached to the torso using any of the fasteners described above. An additional fastening means may be present inferior to the inframammary fold to demonstrate a possible lower inframammary fold (referred to above as the current inframammary fold) that may develop during or after surgery.

In accordance with various embodiments of the present disclosure, an abdominal component can optionally be attached to the abdominal portion of the torso using one or more fasteners. The torso surface can represent the abdominal wall deep to the paired rectus abdominus muscles. The two paired rectus abdominus muscles can be attached to the abdominal wall and manipulable to modify a position of the two paired rectus abdominus muscles, laterally, superiorly, and inferiorly. The two paired rectus abdominus muscles can be brought close together to demonstrate normal abdominal wall anatomy, or separated to represent a diastasis recti or separation of the abdominal wall muscles or abdominal wall hernia.

In some embodiments, there may optionally be an umbilicus attached to the teaching model in the correct anatomical position, fabricated of a synthetic material. The abdominal component can be used to further educate patients, medical students and residents on the use of Acellular Dermal Matrix (ADM) or scaffolds to repair abdominal wall defects, hernias, and aesthetic repair in abdominoplasty.

The rectus muscle may optionally be elevated, based superiorly on fasteners, and/or detached inferiorly, as would occur in a surgical procedure. Further, the rectus muscle may be rotated superiorly with attachable overlying soft tissue material and skin into the contralateral chest to demonstrate autologous breast reconstruction. The mastectomy component of the teaching model may be configured in a similar fashion as the breast-teaching component. Optionally, soft tissue filler may be omitted or removed to represent the loss of breast tissue after a mastectomy.

The teaching model, whether it includes both the breast and abdominal components or not, may be used as a teaching tool for physicians to demonstrate and educate patients about what occurs during breast and abdominal augmentation procedures and possible complications resulting from such procedures.

It can therefore be seen that the teaching model with the modifications described to include an abdominal teaching component is an important tool that can improve both patient and physician education in breast augmentation and breast reconstruction that may lead to improved surgical outcomes and reduced reoperation rates. An improved educational experience may help patients become better informed and therefore better able to make informed consent. As noted above, the teaching model is designed as an educational tool to enhance the hands on teaching of plastic surgery residents, and young plastic surgeons. In addition, it advantageously provides a visual three-dimensional anatomic teaching model for use during patient consultations for procedures including, but not limited to breast augmentation, breast reconstruction, breast implant revision or corrective procedures, breast reconstruction using autologous tissue from the abdomen, fat transfer procedures, the repair of abdominal hernias and soft tissue defects, as well as abdominoplasty procedures. The teaching model of the various embodiments described herein is an educational tool that helps create better informed and engaged patients during pre-operative, post-operative, and at every follow-up stage or visit for years to come. For these reasons, the present disclosure represents a significant advancement in the art, which has substantial commercial merit.

The teaching model, including its various embodiments described herein, was studied, demonstrated, and indicated as an effective educational tool through a study sponsored by the Aesthetic Society Educational Research Foundation (ASERF). In particular, the study was conducted by Dr. Caroline Glicksman and demonstrated that embodiments of the teaching model are an effective tool in educating potential primary breast augmentation and revision-augmentation patients, office staff, and residents and/or medical students regarding various surgical procedures, their complications, appropriate care, and potential outcomes.

A Study Regarding Efficacy of the Teaching Model

The study was designed to evaluate the effectiveness of using embodiments of the teaching model during a 15-20 minute counseling session to define terms and procedures related to primary and revision breast augmentation procedures. The efficacy of the teaching model was then evaluated via a questionnaire designed with a Likert-type scale. The questionnaire evaluated how subjects from each of the three groups felt about their level of education on a variety of concepts related to primary and revision breast augmentation procedures after counseling using the teaching model.

The following three groups were studied: Group 1—potential primary breast augmentation and revision-augmentation patients; Group 2—staff, such as medical assistants, nurse educators, and surgical coordinators; and Group 3—residents or medical students in an accredited plastic surgery program. All three groups were educated using the teaching model and an educational video that demonstrated the teaching model. The three groups were then asked to complete a questionnaire seeking feedback on how effective the teaching model was in demonstrating the concepts indicated in Tables 1 and 2 below. The goal was to obtain at least 25 completed questionnaires in each of the three groups.

Results for the study are represented in Tables 1 and 2 below:

TABLE 1

Was the Teaching Model Effective in Demonstrating the Following Concepts?

| Concept Demonstrated | Strongly Disagree | Disagree | Neither Agree nor Disagree | Agree | Strongly Agree |
|---|---|---|---|---|---|
| Subglandular implant placement | | | 2 | 10 | 40 |
| Submuscular implant placement | | | | 7 | 45 |
| Dual plane implant placement | | | 1 | 10 | 41 |
| Anatomic location of the Pectoralis major and minor muscles | | | 2 | 10 | 40 |
| Anatomic location of the sternum and where the muscle attaches | | | | 13 | 38 |
| Why the patient's anatomy predicts the amount of possible "cleavage" | | | 1 | 7 | 44 |
| "Base width" measurement of the breast | | | | 8 | 44 |
| Importance of selecting an implant that fits the patient's base width measurement | | | | 5 | 47 |
| How and where an implant might be palpated (felt) after breast augmentation | | | | 16 | 36 |
| How to avoid oversizing an implant | | | | 6 | 46 |

TABLE 2

Was the Teaching Model Effective in Demonstrating the Following Concepts?

| Concept Demonstrated | Strongly Disagree | Disagree | Neither Agree nor Disagree | Agree | Strongly Agree |
|---|---|---|---|---|---|
| What a breast implant capsule is | | | | 9 | 43 |
| Meaning and effects of capsular contracture | | | | 12 | 40 |
| Steps taken in the operating room to avoid pocket contamination | | | 1 | 6 | 45 |
| Possible incision locations and their size | | | | 11 | 41 |
| Where an implant pocket will be made | | | 1 | 6 | 45 |

The above Tables 1 and 2 provide the results of the survey taken by participants of the three test groups previously described. As illustrated in Tables 1 and 2 above, the teaching model of the present disclosure has a demonstrated extraordinary and surprising effectiveness in educating plastic surgery patients, staff, residents and medical students on a variety of concepts related to a breast augmentation.

As shall be described in further detail below, it can therefore be seen that the teaching model is an important tool that can improve both patient and physician education in primary and revision breast augmentation as well as breast reconstruction procedures. As a result, the teaching model can substantially improve surgical outcomes, reduce reoperation rates, and set appropriate patient expectations, all of which are critical factors in evaluating the success of a procedure. An improved educational experience may help patients become better informed and therefore better able to make informed consent. The teaching model is designed as an educational tool to enhance the hands-on teaching of plastic surgery residents and young plastic surgeons. In addition, it advantageously provides a visual three-dimensional anatomic model for use during patient consultations for procedures including, but not limited to, breast augmentation, breast reconstruction, breast implant revision or corrective procedures, breast reconstruction using autologous tissue from the abdomen, fat transfer procedures, the repair of abdominal hernias and soft tissue defects, and/or abdominoplasty procedures. The teaching model of the various embodiments described herein is an educational tool that helps create better informed and engaged patients, whether the stage is pre-operative, post-operative, or at every follow-up visit for years to come. For these reasons, the present disclosure represents a significant and important advancement in the art that has substantial commercial merit.

Description of Embodiments of the Teaching Model

FIG. 1 is a front view of a breast and abdominal augmentation teaching model 100 in accordance with some embodiments of the present disclosure. According to various embodiments of the present disclosure, the teaching model 100 may include a female-shaped torso 102 including a chest wall surface 104 and an abdominal wall surface 106. In some embodiments, the teaching model 100 appears as a life size replica of a female torso, which can be placed on a stand or on a table. In other embodiments, however, as illustrated in FIG. 1, the teaching model 100 may be positioned on a stand such as a tripod stand 190 having wheels for ease of transportation of the teaching model 100 to various locations where the demonstrations will be performed. The chest wall surface 104 of the female-shaped torso 102 may be a fabric surface onto which fasteners can be used to secure one or more illustrative components (discussed below) to the torso 102 in various locations. The fasteners and the materials that replicate the skin, soft tissues, breast parenchyma, and muscles of the chest and abdomen may be created out of fabric but could alternatively comprise a more lifelike or synthetic material.

In accordance with some embodiments, the teaching model 100 may include a breast component 110 having an augmentation breast tissue piece 112, a mastectomy breast tissue piece 113, and an abdominal component 130 that are secured onto a fabric cover representing a female-shaped torso 102. The mastectomy breast piece 113 may have decreased to no filling material therein to demonstrate a breast on which a mastectomy has been performed, and from which breast tissue has been removed. In some embodiments, as shall be illustrated in further detail with respect to FIG. 5, teaching model 100 may be used to demonstrate a procedure in which the autologous fat may be injected into breast tissue directly at the breast level. Accordingly, the mastectomy the breast tissue piece 113 may include at least one portal 115 for demonstrating where fat may be introduced into the mastectomy breast tissue piece 113. As shall be described in further detail below, the typical locations used to inject fat into the breast or chest are along the inframammary fold and the lateral and superior breast and chest.

The breast tissue pieces 112 may be formed of anterior and posterior fabric layers 127 and 129 (illustrated in FIGS. 2F-2H) coupled to each other and filled with a batting or other soft tissue filling 125 (illustrated in FIGS. 2F-2H) to represent the adult female breast with an anatomically correct nipple-areola 114. As illustrated in FIG. 1, the abdominal component 130 may include an abdominal tissue piece 134 which may similarly be formed of anterior and posterior fabric layers coupled to each other and filled with a batting or tissue material to represent a female abdomen.

Fastening of the various layers can be accomplished using tethering fasteners, hook and loop fasteners, snap fasteners, and/or grommet fasteners. However, it should be appreciated by one skilled in the art that a variety of different fasteners may also be used to accomplish the underlying goals of the present disclosure, such as, but not limited to, hooks, buttons, and other similar fastening mechanisms.

As a teaching tool for physicians, hospital or clinic staff, medical students, and residents, embodiments of the teaching model disclosed herein can be used to demonstrate a variety of different conditions and procedures relating to augmentation and reconstruction, understanding of round versus shaped devices in augmentation and reconstruction and an understanding of how to avoid and revise the most common breast implant malposition and sizing complications. As a teaching tool for patients, the teaching model can be used to demonstrate the differences between subglandular and dual plane breast augmentation, biodimensional tissue based breast augmentation and reconstruction, breast implant complications, including, but not limited to, malposition deformities, palpability, visibility, capsular contracture, over sizing and under sizing of breast implants, rotation of shaped implants, the different appearance of round and shaped breast implants and the utilization of adjunct procedures, such as acellular dermal grafts and fat transfer in augmentation and reconstruction.

Figure 2A:
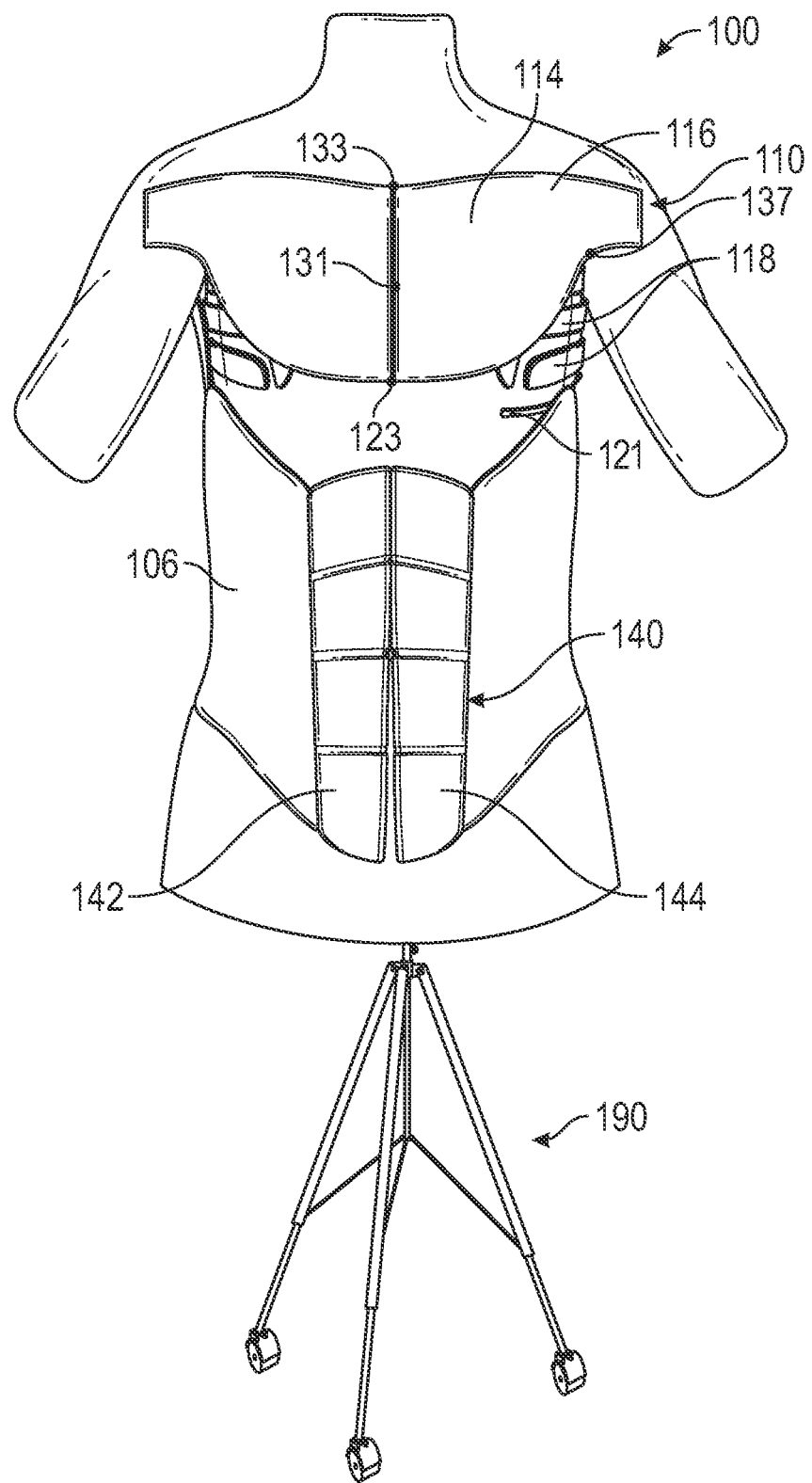
FIG. 2A is a front view of the teaching model in FIG. 1 with the breast tissue piece and the abdominal tissue piece removed, in accordance with some embodiments of the present disclosure.
Figure 2B:
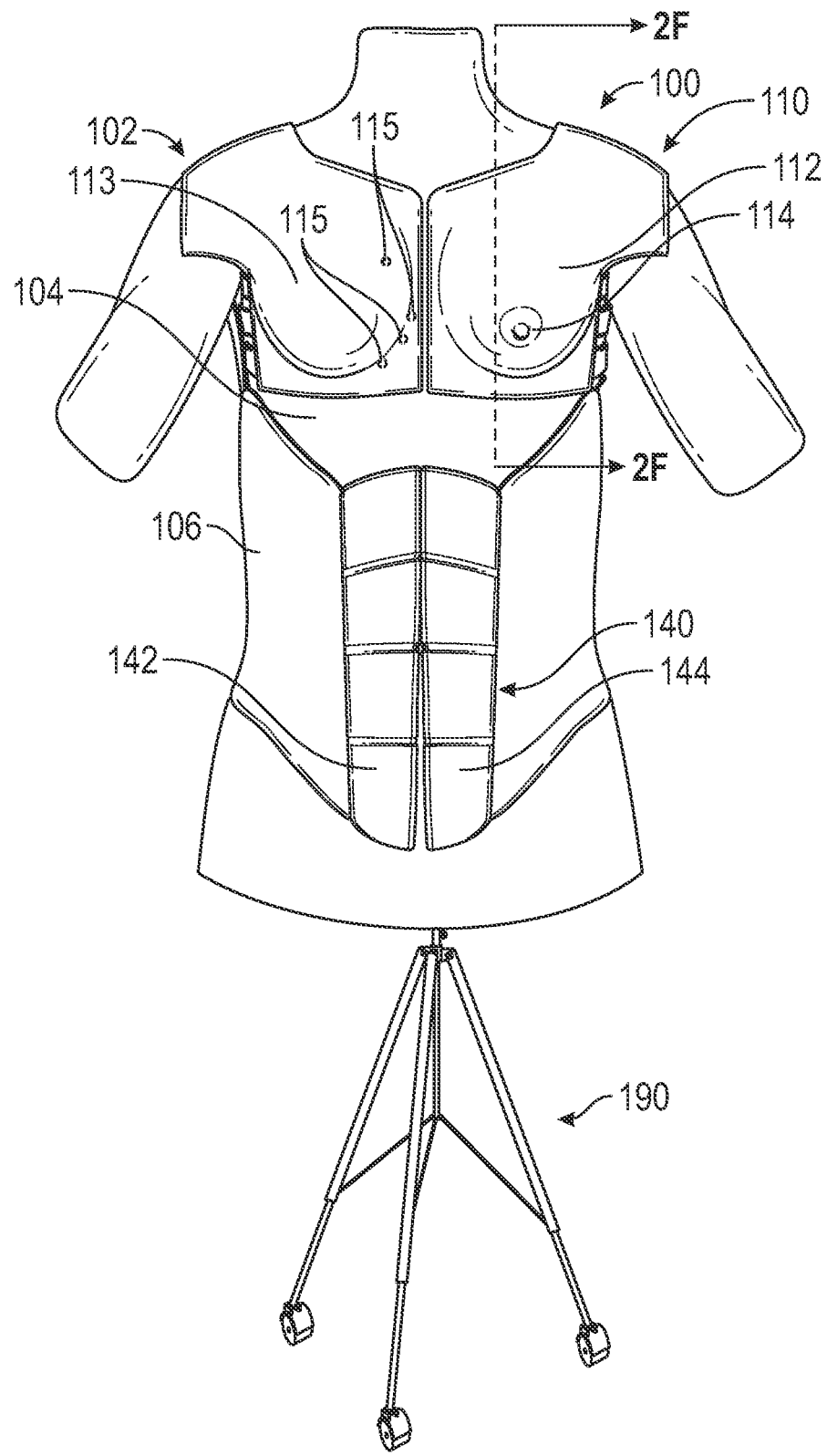
FIG. 2B is a front view of the teaching model in FIG. 1 with the abdominal tissue piece removed, in accordance with some embodiments of the present disclosure.

FIG. 2A is a front view of the teaching model in FIG. 1 with the breast tissue piece 112 and the abdominal tissue piece 134 removed, in accordance with some embodiments of the present disclosure. FIG. 2B is a front view of the teaching model in FIG. 1 with the abdominal tissue piece 134 fully detached, in accordance with some embodiments of the present disclosure. As illustrated in FIGS. 2A and 2B, the abdominal component 130 may be moveable, detachable, and repositionable relative to the abdominal wall surface 106 and the breast component 110. In accordance with some embodiments of the present disclosure relative positions of the abdominal component 130 and of the and the breast component 110 are manipulable on the female-shaped torso to permit a clinician to demonstrate at least one of breast structure of the female anatomy, surgical procedures performed on the female anatomy, and/or adverse body conditions resulting from the surgical procedure.

This configuration may be achieved using a variety of fasteners, e.g., hook and loop fasteners, grommet fasteners, snap fasteners, or any other similar fastening devices. In particular, the abdominal tissue piece 134 may be attached or affixed to the fabric cover of the torso 102 using any one or more of the aforementioned fasteners in order to reveal the underlying anatomy. As depicted, the underlying anatomy may include a rectus muscles fabric layer including paired rectus muscles 142, 144. The rectus muscles fabric layer having paired rectus muscles 142, 144 may comprise two sections of material symmetrically disposed about a sagittal plane of the torso 102.

Educating a Patient about Implant Size Considerations (Bio-Dimensional Planning Using the Teaching Model)

Figure 2C:
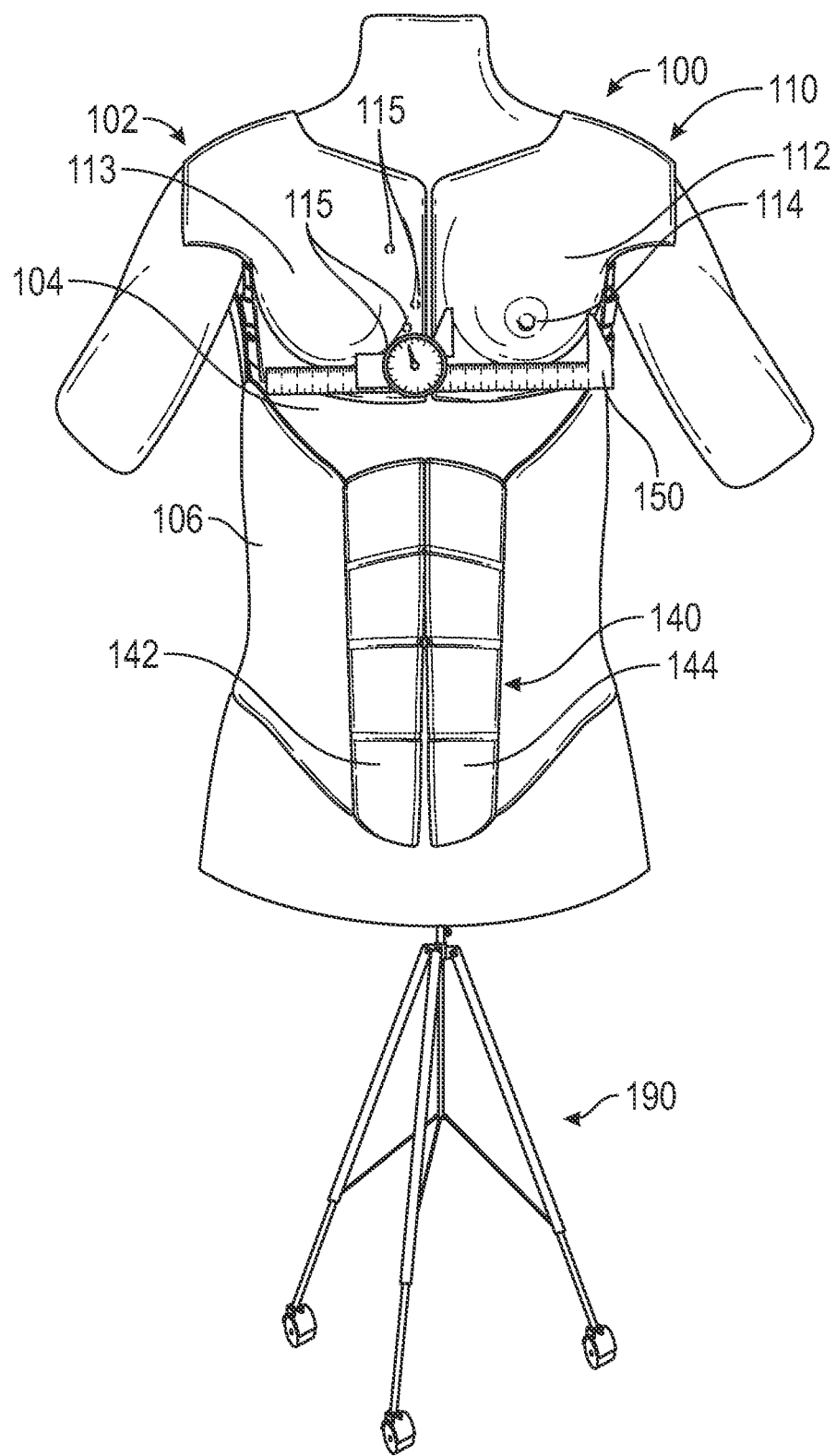
FIG. 2C is a front view of the teaching model in FIG. 2B demonstrating how base width is measured to determine size of an implant, in accordance with some embodiments of the present disclosure.
Figure 2D:
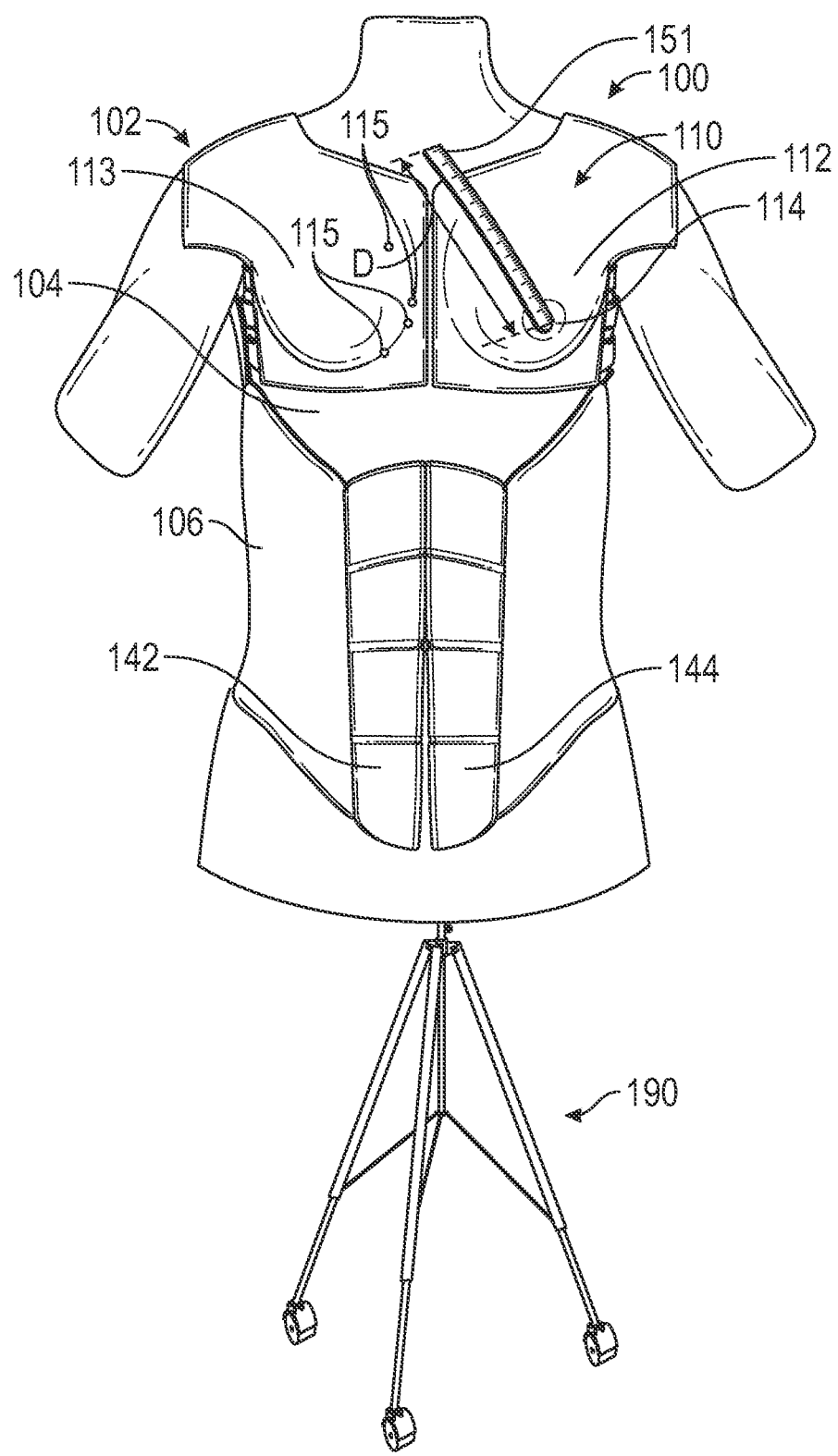
FIG. 2D is a front view of the teaching model in FIG. 2B demonstrating how sternal notch to nipple distance is measured to determine size of an implant, in accordance with some embodiments of the present disclosure.

FIG. 2C is a front view of the teaching model in FIG. 2B demonstrating how base width is measured to determine size of an implant, in accordance with some embodiments of the present disclosure. FIG. 2D is a front view of the teaching model in FIG. 2B demonstrating how a sternal-notch-to-nipple distance is measured to determine size of an implant, in accordance with some embodiments of the present disclosure. In accordance with various embodiments of the present disclosure, the teaching model 100 may be used to educate patients with respect to size limits of the implant to be placed in the patient's chest cavity.

For example, the teaching model 100 may be used to demonstrate how a base width measurement is taken in order to determine an appropriate size of the implant. As depicted in FIG. 2C, a measurement device (e.g., calipers or a measurement tape) 150 may be positioned on the breast tissue piece 112 so as to measure how wide the breast is from side to side. The teaching model 100 may further be used to demonstrate how a suprasternal notch to nipple measurement is taken to determine an appropriate size of the implant. As depicted in FIG. 2D, a measurement device 151 (e.g., a tape measure or a flexible ruler) may be positioned on the breast tissue piece 112 so as to measure a distance D from the nipple 114 to the suprasternal notch in the area of the collar bone. Based on these measurements, a patient may be educated on potential size limits of the implant to be chosen based on the patient's anatomical measurements thereby avoiding a situation where the patient requests an inappropriately large size of implant which could potentially lead to complications or further issues in the future. Thus, the patient can understand using the teaching model 100 that the implant cannot be chosen merely based on how wide or large the patient would like the implant to be, but that instead the measurements of the implant need to be based upon the patient's anatomy.

With the teaching model 100, individual bodily limits with regard to implant size and breast positioning and shape can be demonstrated to, and understood by patients, medical staff and students in training, as well as other staff involved in educating and communicating with patients.

For example, the teaching model 100 can be used to demonstrate that a position where the pectoralis major muscle piece 116 terminates on the female-shaped torso 102 corresponds to where the implant 120 should terminate. The teaching model 100 may also be used to educate the patient that the end or edge of the chest wall surface 104 of the female-shaped torso corresponds to where the boundary of the implant should be unless a patient wants to experience some of the complications known as visibility or palpability when an implant is placed beyond breast and into the very thin overlying soft tissues.

Demonstration of Female Anatomy Using the Teaching Model

Figure 2E:
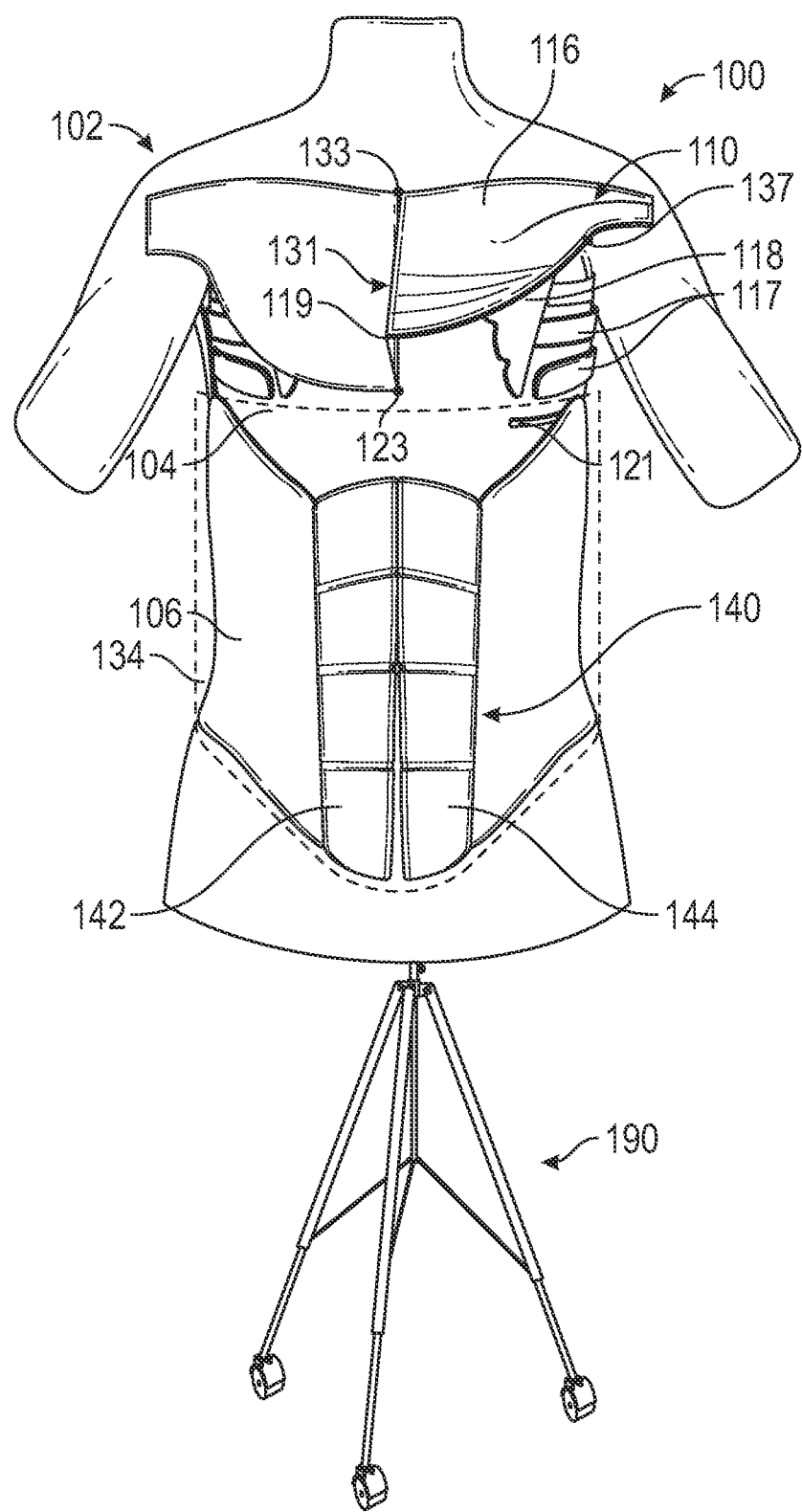
FIG. 2E is a front view of the teaching model in FIG. 1 with the breast tissue piece removed and the pectoralis major muscle lifted, and the abdominal tissue removed, in accordance with some embodiments of the present disclosure.

FIG. 2E is a front view of the teaching model in FIG. 1 with the breast tissue piece 112 lifted, and the abdominal tissue piece removed, in accordance with some embodiments of the present disclosure. As depicted, the anatomical teaching model 100 may further include a pectoralis major muscle piece 116 attachable to the chest wall surface 104. The pectoralis major muscle piece 116 may be positioned to sit under the breast tissue piece 112. Relative positions of the pectoralis major muscle piece 116 and of the breast tissue piece may be manipulable to permit a clinician to demonstrate a female anatomy, a surgical procedure to the female anatomy, and/or a condition resulting from the surgical procedure.

In some embodiments, the breast tissue piece 112 attaches to the pectoralis major muscle piece 116. In particular, the breast tissue piece 112 may removably attach to the pectoralis major muscle piece 116 using at least one fastener F (illustrated in FIG. 2F). The fastener F may be selected from the group consisting of a hook and loop fastener, a grommet fastener, a snap fastener, and a combination thereof.

Similar to the breast tissue piece 112, various fasteners 131, 133, 137 may be used to removably attach the pectoralis major muscle fabric piece 116 to the torso 102 at several positions. For example, the pectoralis major muscle fabric piece 116 may be attached to the fabric cover of the torso 102 along the sternal border (e.g. using tethered fastener 123), the clavicle (e.g., using fastener 133) and the axilla (e.g., using fastener 137). The fasteners may also be positioned along the anterior axillary line.

In some embodiments, the fasteners may attach the pectoralis major muscle fabric piece 116 superiorly along the clavicle, medially along the length of the sternum, and/or laterally in the superior axilla near the humeral head. In some embodiments, the inferior-lateral attachments may be free, and not attached to the female-shaped torso 102 so as to allow folding and flipping over of the breast tissue piece 112 and the pectoralis major muscle fabric piece 116, as well as insertion of implant 120 into a cavity defined between the pectoralis major muscle fabric piece 116 and the chest wall surface 104. Although only one pectoralis major muscle fabric piece 116 may be illustrated in some embodiments for the sake of clarity, the various embodiments of the present disclosure are not limited to the aforementioned configuration. For example, the teaching model 100 may include two pectoralis major muscle fabric pieces 116 symmetrically disposed about a sagittal plane of the female-shaped torso 102.

According to various embodiments of the present disclosure, the anatomical teaching model 100 may further include a pair of rectus muscle pieces 142, 144 that is attachable to the abdominal wall surface 106. The pair of rectus muscle pieces 142, 144 may be two sections of material that are positionable symmetrically about the sagittal plane of the female-shaped torso 102.

Optionally, in some embodiments, the teaching model 100 may further include an abdominal tissue piece 134 (illustrated in FIG. 1) positionable over the pair of rectus muscle pieces 142, 144.

In accordance with some embodiments, the abdominal tissue piece 134 may attach to at least one of the pair of rectus muscle pieces 142, 144 or to the abdominal wall surface 106. For example, the abdominal tissue piece 134 may attach to at least one of the pair of rectus muscle pieces using at least one fastener selected from the group consisting of a hook and loop fastener, a grommet fastener, a snap fastener, and a combination thereof.

The pectoralis major muscle piece 116, the breast tissue piece 112, and/or the pair of rectus muscle pieces 142, 144 may be formed of a stretchable fabric material. In some embodiments, the pectoralis major muscle piece 116, the breast tissue piece 112, and/or the pair of and the pair of rectus muscle pieces 142, 144 are formed of a synthetic material. Such embodiments can advantageously provide a stretching capability for the materials of components of the teaching model 100 described herein, which can be helpful to illustrate features of procedures and anatomy.

As shall be described in further detail below, relative positions of the pair of rectus muscle pieces 142, 144, and the abdominal tissue piece 134 are manipulable to permit a clinician to demonstrate at least one of a female anatomy, a surgical procedure to the female anatomy, or a condition prompting or resulting from the surgical procedure.

According to various embodiments of the present disclosure, the teaching model 100 may include a pectoralis minor muscle piece 118 removably attachable to the chest wall surface 104. As depicted in FIG. 2E, the pectoralis minor muscle piece 118 may be positioned underneath the pectoralis major muscle piece 116. In some embodiments, a serratus muscles piece 117 may be positioned adjacent to the pectoralis minor muscle piece 118 and removably attached to the chest wall surface 104 in a similar manner to the pectoralis minor muscle piece 118. As depicted, the serratus muscle piece 117 may be positioned at least partially underneath the pectoralis major muscle piece 116.

The teaching model 100 may further include an original inframammary fold fabric 121 removably attached to the chest wall surface 104 at a position on the female-shaped torso 102 between the pectoralis major muscle piece 116 and the pair of rectus muscle pieces 142, 144. In accordance with some embodiments, the inframammary fold 121 may alternatively be written, painted or otherwise marked onto the female-shaped torso. In some embodiments, a second inframammary fold 122 (illustrated in FIG. 2F) may be positioned on the female torso 102 to demonstrate a condition in which placements of the inframammary fold may be adjusted during a surgical procedure.

Figure 2F:
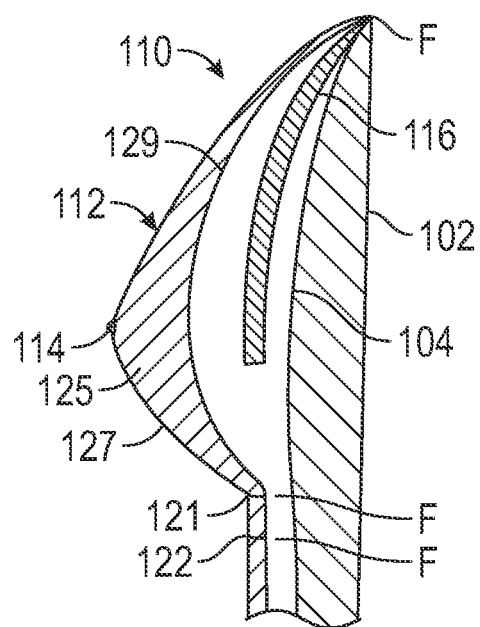
FIG. 2F is a cross-sectional view taken along the line 2F-2F in FIG. 2B, in accordance with some embodiments of the present disclosure.

FIG. 2F is a cross-sectional view taken along the line 2F-2F in FIG. 2B, in accordance with some embodiments of the present disclosure. As depicted in FIG. 2F, the anatomic breast tissue piece 112 may be formed of two fabric layers 127 and 129 coupled to each other with a soft compressible filling 125 positioned between the two fabric layers 127 and 129.

In accordance with some embodiments, the two fabric layers 127 and 129 may respectively represent an anterior skin surface and a deep layer of the breast tissue piece 112. As previously discussed above, pectoralis major muscle piece 116 and breast tissue piece 112 may be attached to the female-shaped torso using at least one of the aforementioned fasteners. This allows the teaching model 100 to be used repeatedly to demonstrate various breast surgical procedures and associated complications including, but not limited to breast augmentation, breast reconstruction, breast implant complications and breast implant revision or corrective procedures.

Educating a Patient About the Location of the Implant

Figure 2G:
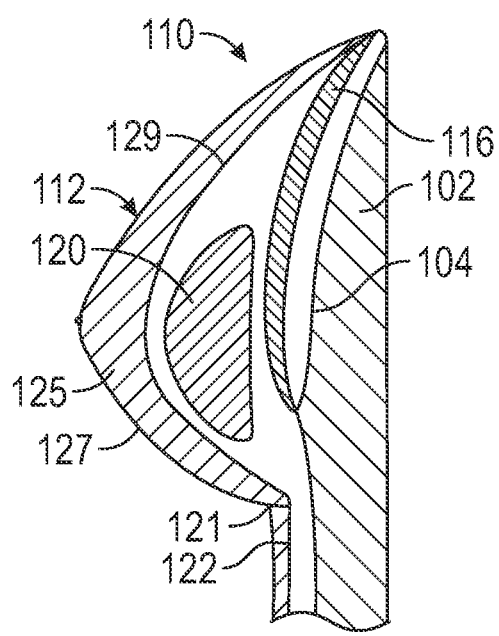
FIG. 2G is the cross-sectional view of FIG. 2F showing placement of an implant subglandular, in accordance with some embodiments of the present disclosure.
Figure 2H:
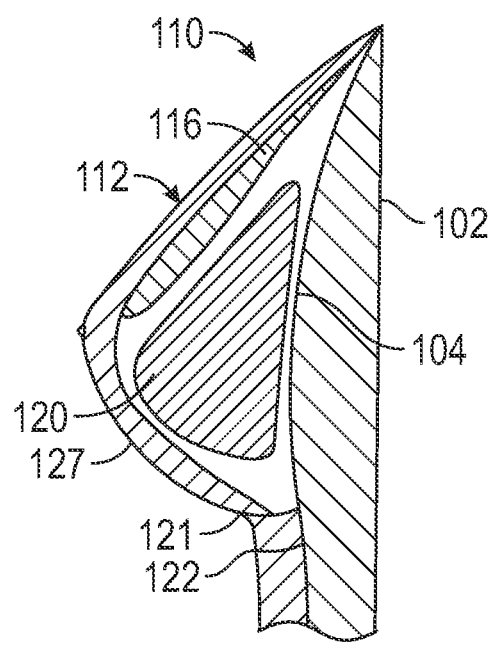
FIG. 2H is the cross-sectional view of FIG. 2F showing partial submuscular (dual plane) placement of an implant.

FIG. 2G is the cross-sectional view of FIG. 2F showing placement of an implant 120 subglandular, in accordance with some embodiments of the present disclosure. FIG. 2H is the cross-sectional view of FIG. 2F showing partial submuscular (dual plane) placement of an implant 120. As depicted in FIGS. 2F and 2G, currently available breast implants 120 may be utilized by the clinician to demonstrate the placement of the implants 120 in various pockets of the body.

For example, the clinician may use the teaching model 100 to demonstrate a subglandular positioning of the implant where the implant 120 is positioned sitting beneath the breast tissue piece 112 and the gland as depicted in FIG. 2G. The clinician may use the teaching model 100 to demonstrate a partial submuscular (dual plane) positioning of the implant where the implant 120 is positioned partially beneath the pectoralis major muscle piece 116 and partially beneath the gland. The breast tissue piece 112 and the pectoralis major muscle piece 116 can each be stretched or elevated to reveal the deeper tissue layers if desired.

Figure 3:
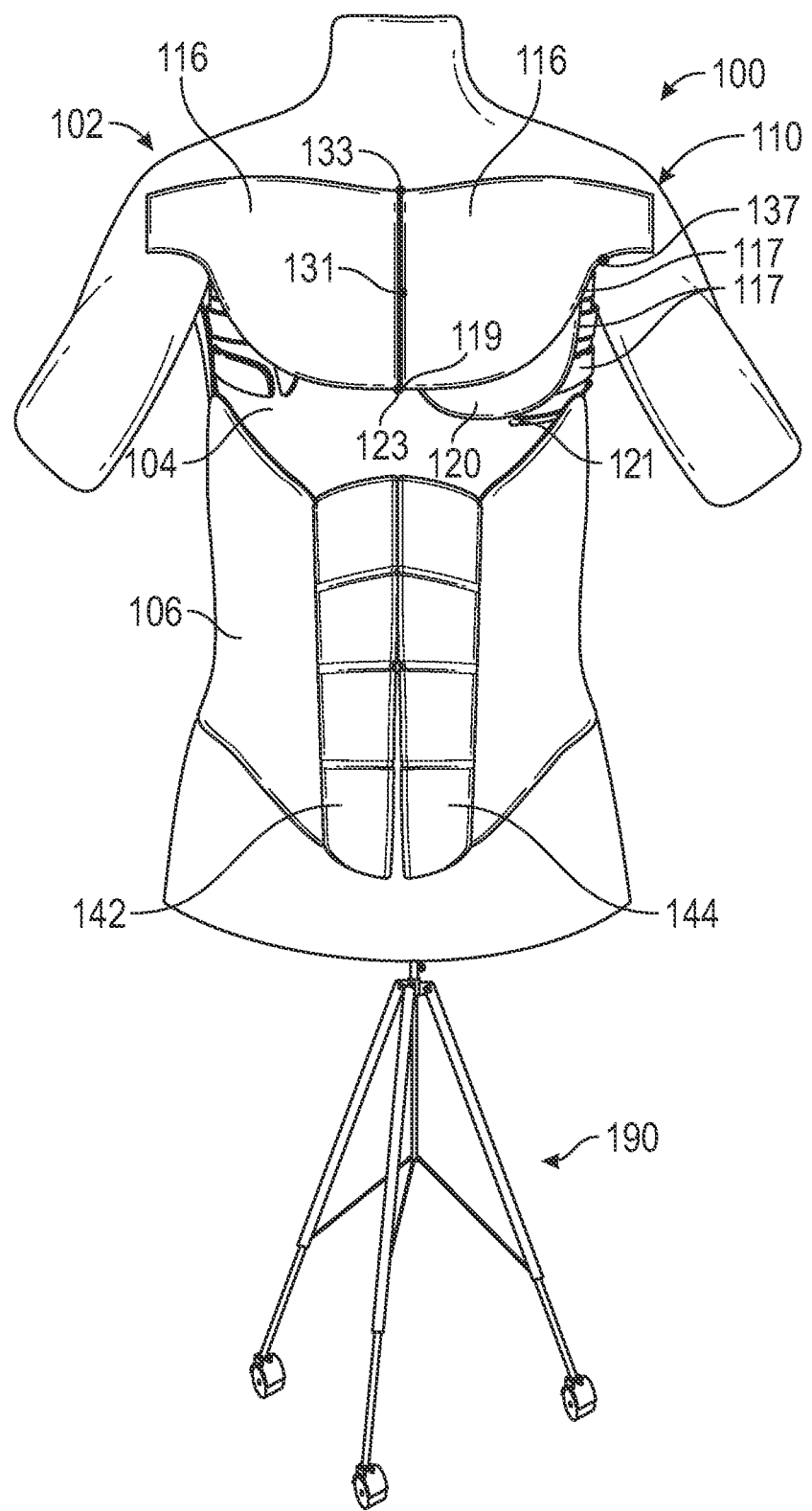
FIG. 3 is a front view of the teaching model in FIG. 2E illustrating an implant capsule placed under a fabric layer representing pectoralis major muscles, in accordance with some embodiments of the present disclosure.

Educating a Patient About Breast Surgery Complications and Revision Surgery to Correct Complications FIG. 3 is a front view of the teaching model in FIG. 2E illustrating an implant capsule placed under a pectoralis major muscle piece 116, in accordance with some embodiments of the present disclosure.

As depicted, the pectoralis major muscle piece 116 may be attached at a lower portion or edge 119 thereof to the chest wall surface 104. In particular, the pectoralis major muscle piece 116 may be tethered at an inferior aspect thereof (represented by the lower portion or edge 119) to the chest wall surface 104 in order to demonstrate situations and complications which routinely occur as a result of breast surgery.

For example, a tether fastener 123 may movably and detachably couple the pectoralis major muscle piece 116 to the chest wall surface 104. The tether fastener 123 may include an elastic string portion 128 (illustrated in FIG. 4A) which may allow the pectoralis major muscle piece 116 to be pulled away from the chest wall surface 104 without completely detaching therefrom. The aforementioned tether fastener is advantageous in that it allows for a volume of a cavity between the chest wall surface 104 and the pectoralis major muscle piece 116 to be variably increased depending on a size of the implant 120 to be inserted therein.

Educating a Patient About Window Shading

Figure 4A:
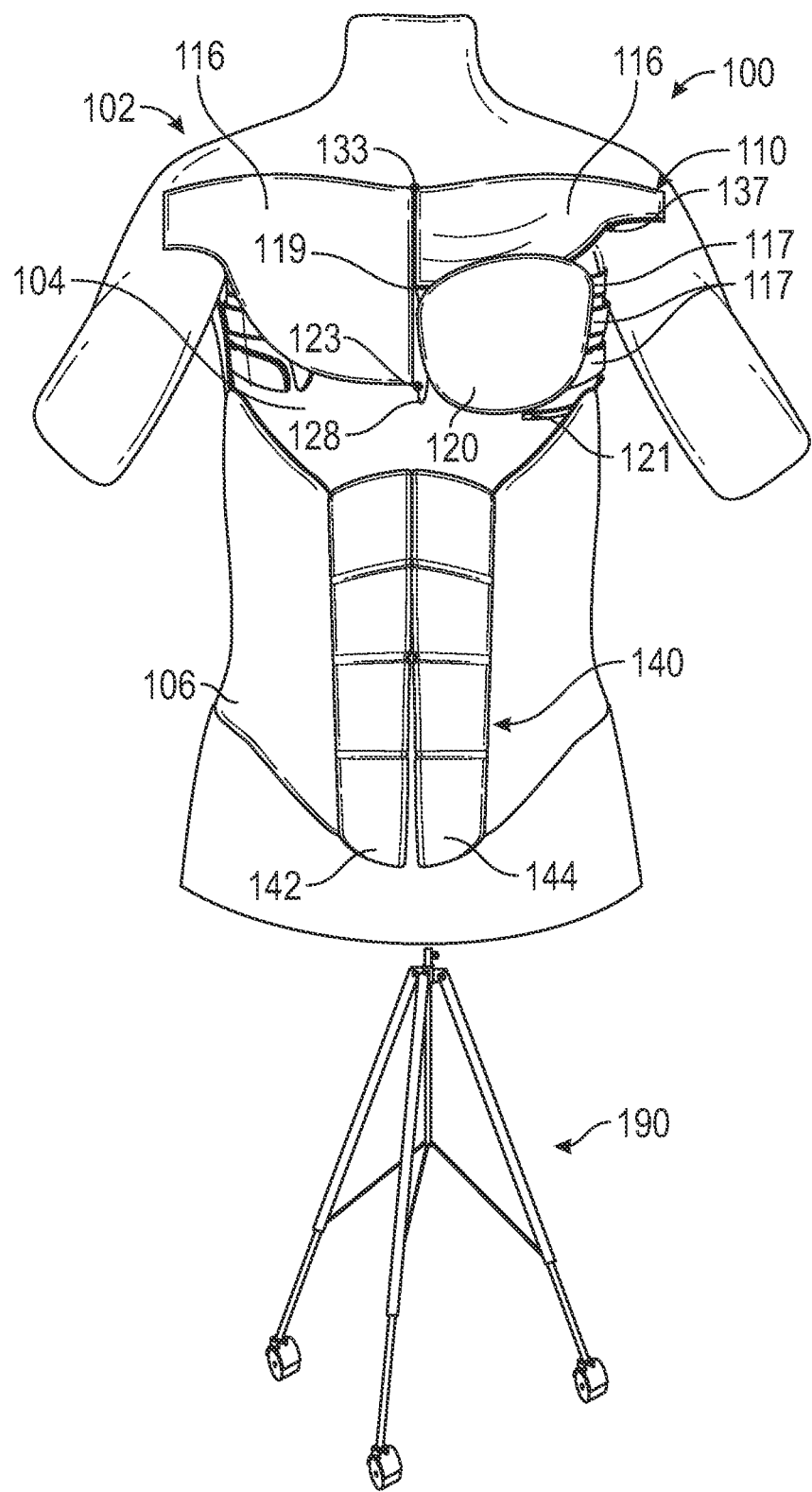
FIG. 4A is a front view of the teaching model in FIG. 2E illustrating how the teaching model may be used to demonstrate the condition of window shading, in accordance with some embodiments of the present disclosure.

FIG. 4A is a front view of the teaching model in FIG. 2E illustrating how the teaching model 100 may be used to demonstrate the condition of window shading, in accordance with some embodiments of the present disclosure. The teaching model 100 may be used to demonstrate the condition of window shading where the pectoralis major muscle piece 116 has been cut or otherwise divided and retracts back, and an implant 120 underneath the lifted pectoralis major muscle piece 116 sits exposed. As illustrated in FIG. 4A, the implant 120 may be located in the correct position, but the pectoralis major muscle piece 116 may be "window-shaded" or pulled superiorly (pulled upwards) as a result of being cut during surgery. Due to the decreased or lack of surface area coverage of the pectoralis major muscle piece 116 on the chest wall surface 104, the implant may be palpable and visible through the skin.

Window shading may be demonstrated by pulling the tethered lower portion or edge 119 of the pectoralis major muscle piece 116 away from the chest wall surface 104 to release the direct sternal attachment, and sliding the lower portion or edge 119 of the pectoralis major muscle piece 116 up onto the chest wall surface 104 in the direction of the collar bone. The teaching model 100 may thus be used to demonstrate the decreased surface area coverage of the pectoralis major muscle piece 116 on the chest wall surface 104 when window shading occurs.

Educating a Patient About Symmastia

Figure 4B:
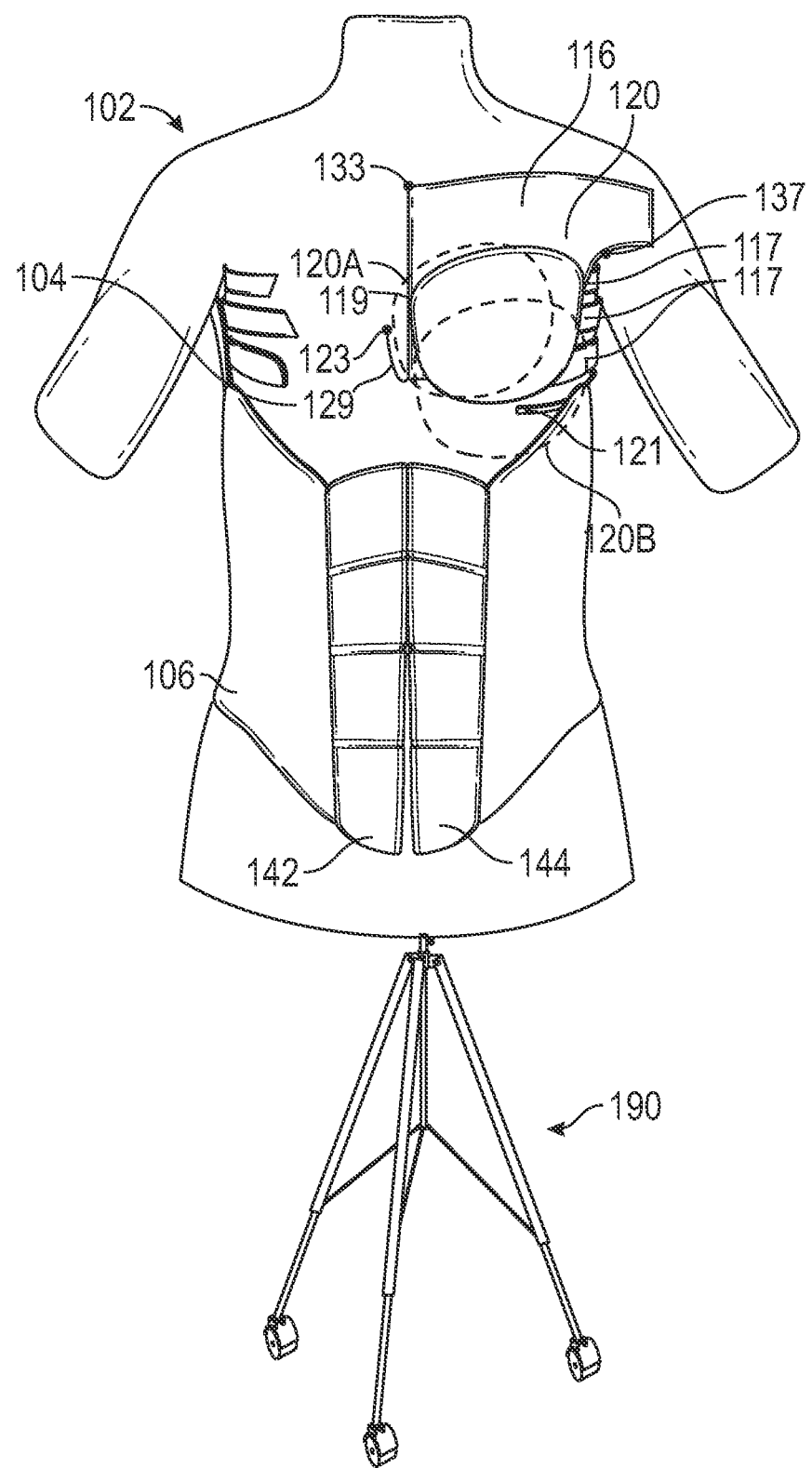
FIG. 4B is a front view of the teaching model in FIG. 2E illustrating how the teaching model may be used to demonstrate the condition of symmastia, in accordance with some embodiments of the present disclosure.

FIG. 4B is a front view of the teaching model in FIG. 2E illustrating how the teaching model may be used to demonstrate the condition of symmastia, in accordance with some embodiments of the present disclosure. In accordance with some embodiments, as illustrated in FIG. 4B, the teaching model 100 may be used to demonstrate the condition of symmastia which is a complication of breast implant surgery in which there has been damage to the soft tissues of the breast or muscle, thereby causing the implant to develop a medial malposition. As illustrated, medical malposition may occur when the implant 120 slides underneath the pectoralis major muscle piece 116 and crosses a midline as illustrated by the implant 120A in dashed lines. This occurs for example, when pectoralis major muscle piece 116 is cut and retracts back, similar to window shading, and the implant 120 slides underneath the pectoralis major muscle piece 116 to a position (e.g., a medial position, such as where implant 120A is located) overlapping a midline defined by the sagittal plane of the female-shaped torso 102.

Symmastia may be demonstrated by pulling the tethered lower portion or edge 119 of the pectoralis major muscle piece 116 away from the chest wall surface 104 to release the direct sternal attachment, and sliding the lower portion or edge 119 of the pectoralis major muscle piece 116 up onto the chest wall surface 104 in the direction of the collar bone. The implant 120 may then be slid in the cavity between the pectoralis major muscle piece 116 and the chest wall surface 104 to a position that crosses the midline, as illustrated in FIG. 4B.

Educating a Patient About Inferior Malposition

In accordance with various embodiments of the present disclosure, the teaching model 100 may be used to educate a patient about procedures for correcting complications resulting from breast implant surgery.

In some embodiments, the teaching model 100 may be used to demonstrate how a condition where when an implant 120 has fallen out of a capsule pocket 200 that it was originally placed in (either because it was too heavy or the doctor over dissected or just with time the implant 120 has descended on the chest wall) and how it may be corrected. For example, FIG. 4B illustrates an inferior malposition condition where the implant 120 has dropped from the correct position to an "inferior malposition" too far below the correct breast position, for example, the position where implant 120B sits (as illustrated in dashed lines).

Educating a Patient About Capsular Contracture

Figure 2I:
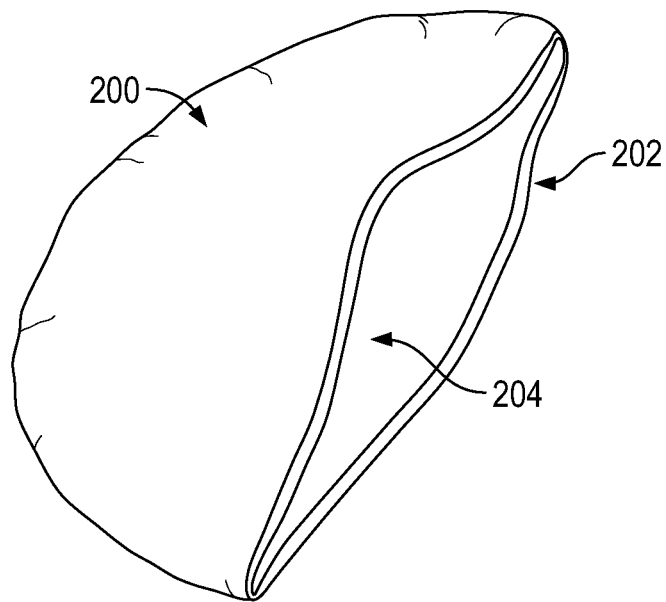
FIG. 2I is a perspective view of an exemplary capsule pocket.
Figure 2J:
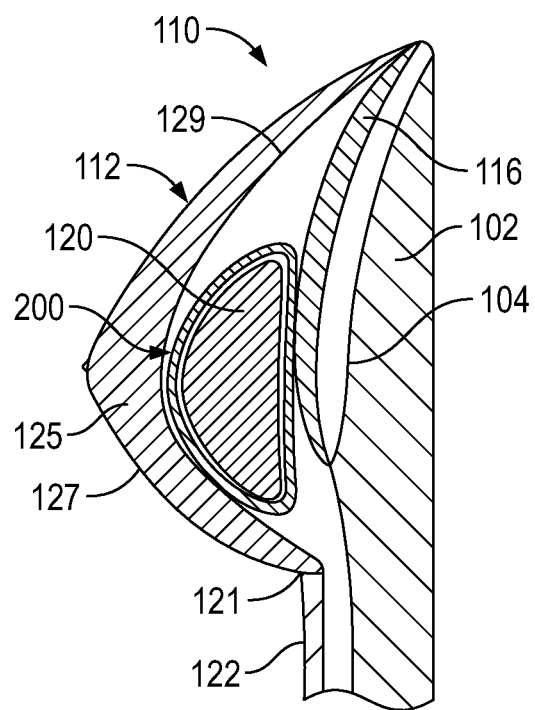
FIG. 2J is cross-sectional view of FIG. 2F showing the location of a capsule pocket in a subglandular implant placement, in accordance with some embodiments of the present disclosure.
Figure 2K:
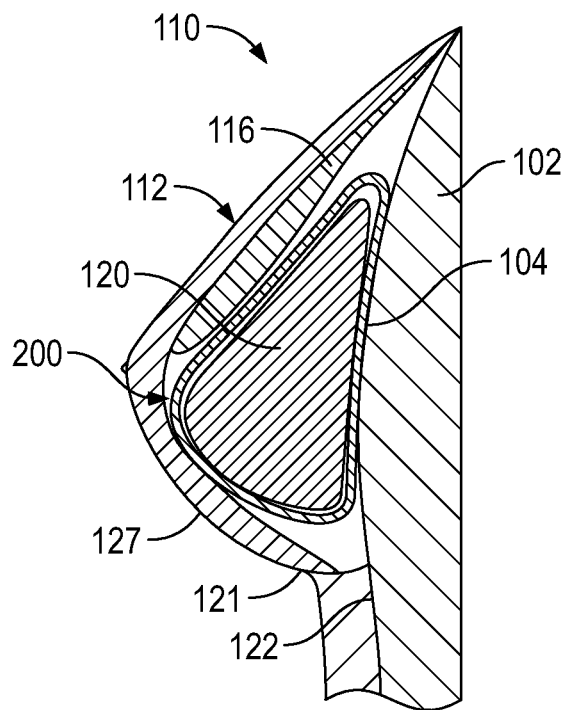
FIG. 2K is a cross-sectional view of FIG. 2F showing the location of a capsule pocket in a partial submuscular (dual plane) placement of an implant.

In accordance with some embodiments, the teaching model 100 may be used to demonstrate a capsular contracture. To this effect, in accordance with some embodiments the teaching model 100 may include a capsule pocket 200 (see FIG. 2I) configured to be inserted between the pectoralis major muscle piece 116 and the chest wall surface 104 (see FIG. 2K) or between the breast soft tissue 112 and the anterior surface of the pectoralis muscle 116 (see FIG. 2J) to demonstrate a capsular contracture in the subglandular space. The capsule pocket 200 may have an opening 202 for insertion of an implant 120 and be utilized to demonstrate a capsule which is a normal tissue structure that forms around the implant 120. As depicted in FIG. 3, the implant 120 may be generally sitting partially behind the pectoralis major muscle piece 116.

In some embodiments, however, the implant 120 may be positioned on top of the pectoralis major muscle piece 116. A patient can understand what a capsular contracture is by a tightening of the capsule pocket 200 having the implant 120 placed therein and placing the breast tissue piece 112 over the tightened pocket of material to visually demonstrate a very hard breast.

In accordance with some embodiments, the teaching model 100 may be used to demonstrate procedures for treatment of the capsular contracture such as capsulectomy. The capsulectomy may be demonstrated by making an incision on the breast tissue piece 112 to get to the capsule pocket 200, making a further incision on the capsule pocket, and removing the implant 120 from the inside 204 of the capsule pocket 200. By demonstration, the patient may understand that when the implant 120 is removed, the capsule pocket 200 may still remain. As such, the patient may be educated on what a capsulectomy is and why it takes time in the operating room to perform that procedure. The patient may further be educated on what occurs during the procedure of a capsulotomy by using the teaching model 100 to demonstrate how a small cut may be made in the capsule pocket 200 in order to widen the capsule pocket 200 or to change its position.

Educating a Patient about Transfer of Autologous Fat from the Abdominal Area for Breast Reconstruction.

Figure 5:
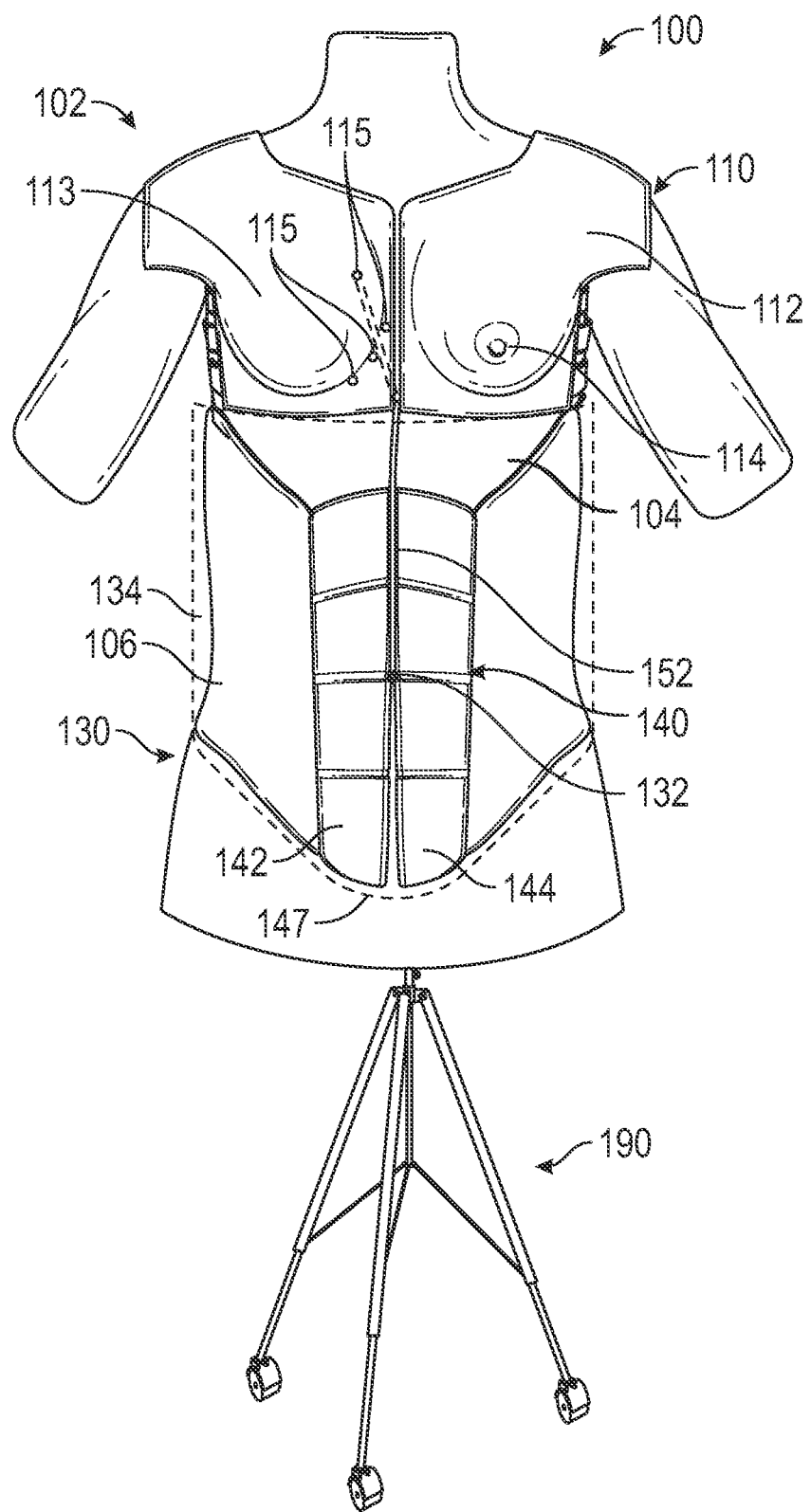
FIG. 5 is a front view of a breast and abdominal augmentation teaching model illustrating breast reconstruction using autologous tissue, in accordance with some embodiments of the present disclosure.

In accordance with some embodiments, the teaching model 100 may be used to demonstrate how a breast deformity may be corrected through the injection of autologous fat into the breast tissue. FIG. 5 is a front view illustrating introduction of autologous fat from underneath the abdominal tissue piece 134 into the breast tissue piece 112, in accordance with some embodiments of the present disclosure.

As illustrated in FIG. 5, the abdominal tissue piece 134 may include a hole 132 extending therethrough at a position on the female-shaped torso corresponding to a location of the belly button. Fat grafting to the chest and breast has become an integral part of breast augmentation, breast reconstruction, and breast revision procedures. During these procedures, fat may be harvested from a distant location on the body, processed, and grafted to areas that need soft tissue coverage.

In order to demonstrate the procedure of transferring autologous fat from the abdominal component 130 to the breast component 110, a tube 152 may be inserted into the hole 132 in the abdominal tissue piece 134 and advanced under the abdominal tissue piece 134 up into the breast tissue piece 112. As such, a patient may visualize how autologous fat may be transferred from the abdomen, through the small tube 152, and into the breast in order to correct an existing breast deformity or to augment the breast to match an opposite breast. The patient can thereby understand how fat may be transferred to the breast from underneath the abdominal and breast tissue pieces in order to avoid producing scars on the skin of the breasts. The teaching model 100 may further be used to demonstrate a procedure in which the autologous fat may be injected into the breast tissue directly at the breast level. For example, the mastectomy breast tissue piece 113 may include at least one portal 115 for demonstrating where fat may be introduced into breast tissue.

The portal 115 openings illustrated on the teaching model 100 are representative of areas where fat may be injected during a simulated surgical procedure. Patients, staff, residents, and medical students can understand how and where fat may be placed to correct soft tissue deficiencies. The typical locations used to inject fat into the breast or chest are along the inframammary fold and the lateral and superior breast and chest. The portals are representative of how the procedure is done, and help to demonstrate where and why fat grafting may be performed.

Educating a Patient about a Tummy Tuck Procedure

In accordance with some embodiments, the teaching model 100 may be used to demonstrate what occurs during surgical procedures to the abdomen 140. In particular, the teaching model 100 may be used to demonstrate a tummy tuck procedure.

In order to demonstrate the tummy tuck procedure, the abdominal tissue piece 134 may be elevated at its free end 147 to reveal the underlying pair of rectus muscle pieces 142, 144. In some aspects, the pair of rectus muscle pieces 142, 144 may be positioned spaced apart from each other to illustrate a diastasis condition commonly occurring during weight gains, weight losses and most often pregnancy. The diastasis may occur as a result of the pair of rectus muscle pieces 142, 144 being stretched and pulled away from each other. A repair of the diastasis condition may be demonstrated using the teaching model 100 by pulling the pair of rectus muscle pieces 142, 144 towards each other and illustrating how the pair of rectus muscle pieces 142, 144 may be sewn together at a first position above the belly button, and at a second position below the belly button to repair the diastasis condition. The abdominal tissue piece 134 may then be pulled and stretched over the pair of rectus muscle pieces 142, 144 and tucked inwards towards the pair of rectus muscle pieces 142, 144 to demonstrate the tummy tuck.

Educating a Patient about Use of Abdominal Wall Support with A-Cellular Dermal Matrixes (ADM)

In some embodiments, the teaching model 100 may be utilized to demonstrate use of abdominal wall support with ADM.

Figure 6:
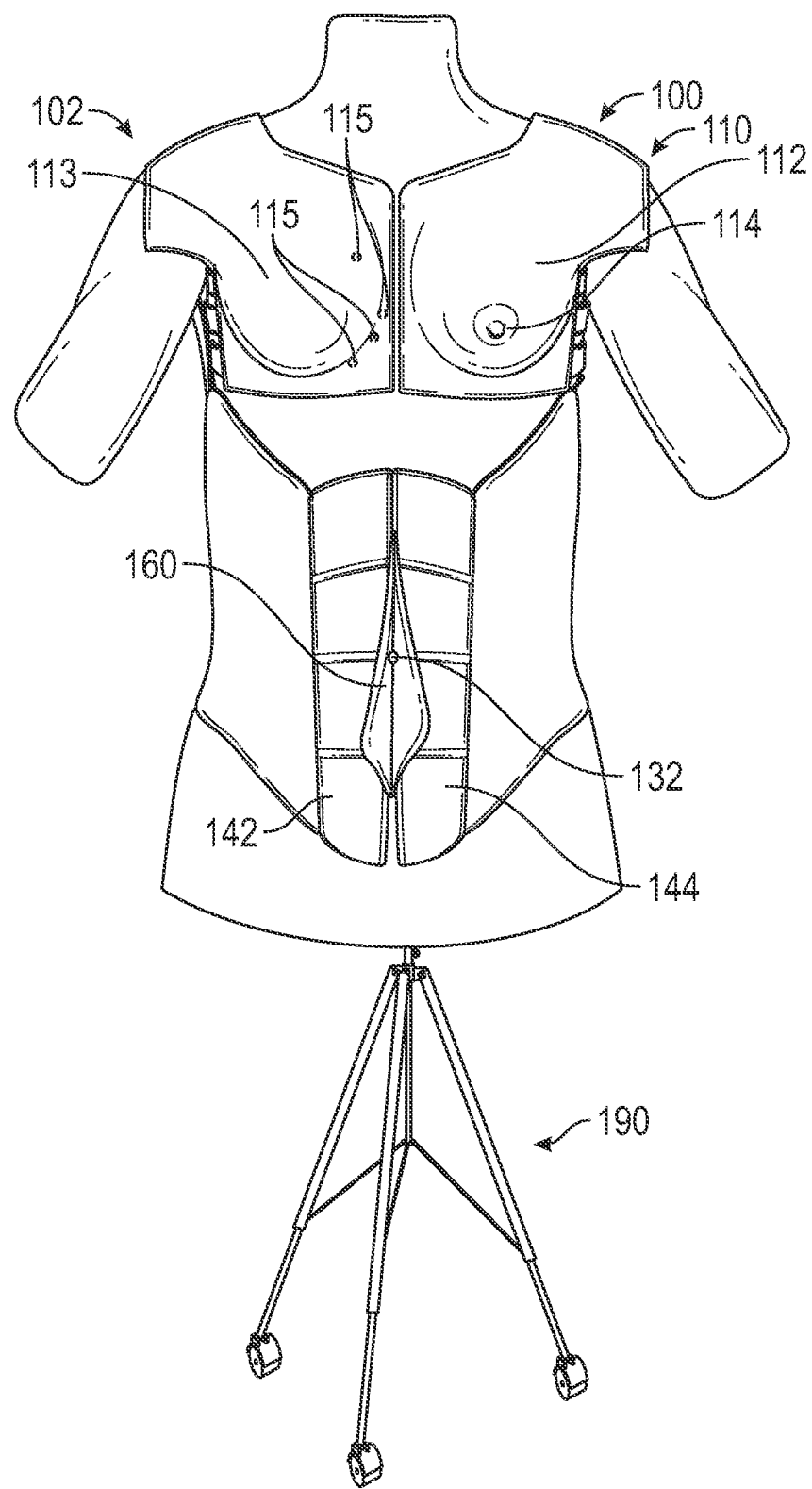
FIG. 6 is a front view of the teaching model in FIG. 2B illustrating repair to an abdominal wall surface, in accordance with some embodiments of the present disclosure.

For example, the teaching model 100 may be utilized to demonstrate scenarios in which abdominal wall repair is necessary, as well as what occurs during the abdominal wall repair. FIG. 6 is a front view illustrating repair to an abdominal wall surface, in accordance with some embodiments of the present disclosure.

In these embodiments, the abdominal tissue piece 134 may be detached from the abdominal wall surface 106 of the female-shaped torso 102. The patient may be educated that a condition in which a portion of muscle missing from one or both of the pair of rectus muscle pieces 142, 144 may have occurred as a result of the aforementioned breast reconstruction using autologous tissue. The teaching model 100 may thus be used to demonstrate how a gap or a soft tissue defect between the pair of rectus muscle pieces 142, 144 may be repaired by positioning a support fabric piece 160 in the gap between the pair of rectus muscle pieces 142, 144 and stitching or otherwise coupling the support fabric piece 160 to the pair of rectus muscle pieces 142 at the location of the gap to provide support the abdominal wall surface.

Advantageously, patients are able to develop an understanding of some of the complications resulting from breast reconstruction surgery, as well as surgical procedures to correct these complications. In some embodiments, the teaching model 100 may be used to demonstrate a procedure to correct or repair a condition in which a patient has a hernia. In these embodiments, the support fabric piece 160 may be placed on top of and overlaying the pair of rectus muscle pieces 142, 144 at the location of the gap to provide support the abdominal wall surface.

Educating a Patient About Breast Reconstruction Using Autologous Tissue

Figure 7:
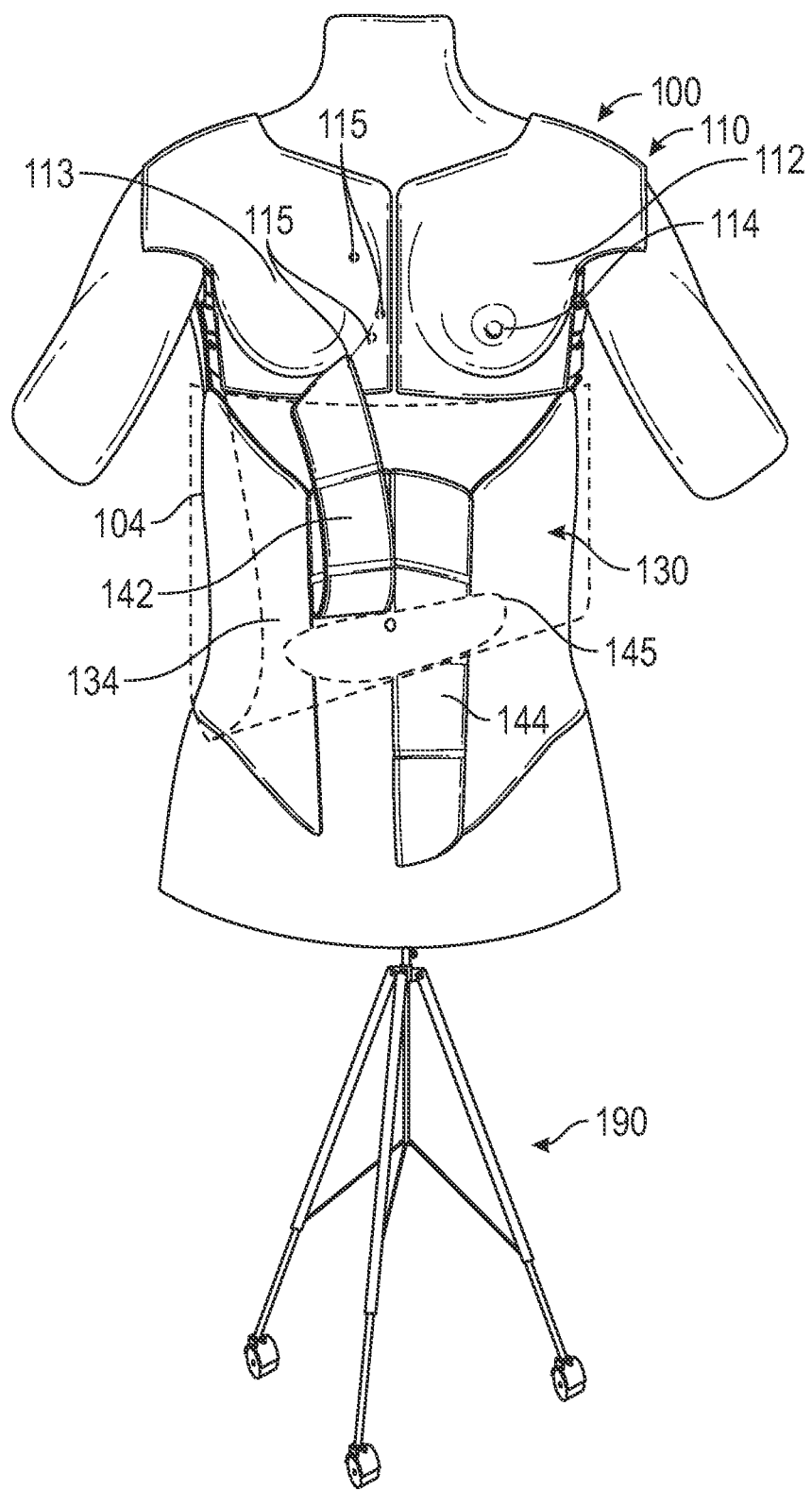
FIG. 7 is a front view of the teaching model in FIG. 2B illustrating breast reconstruction using autologous tissue, in accordance with some embodiments of the present disclosure.

In some embodiments, the teaching model 100 may be used to demonstrate breast reconstruction using autologous tissue. FIG. 7 is a front view illustrating breast reconstruction using autologous tissue, in accordance with some embodiments of the present disclosure.

As illustrated in FIG. 7, the teaching model 100 may further include a mastectomy breast piece 113 having decreased to no filling material therein. In order to illustrate breast reconstruction using autologous tissue, the abdominal tissue piece 134 may be elevated at its free end to reveal the underlying pair of rectus muscle pieces 142, 144. One of the pair of rectus muscle pieces 142 may then be used to demonstrate how a portion of the rectus muscle piece 142 may be pulled and folded upwards towards the abdominal wall surface 103 together with a portion of the skin of the abdominal tissue piece 134 to form tissue for the mastectomy breast piece 113.

In some embodiments, the pair of rectus muscle pieces 142, 144 may be utilized to demonstrate how each of the rectus muscle pieces 142, 144 have a dual blood supply which allows them to feed the breast tissue during breast reconstruction. In particular, the teaching model 100 may be used to demonstrate that blood vessels of the blood supply of the rectus muscle piece 142 may be paired with a portion of the abdominal tissue piece 134 and inserted into the breast component 110 to reconstruct the mastectomy breast piece 113.

For example, as illustrated in FIG. 7, skin and fat which are removed from a donor site 145 of the abdominal tissue piece 134, along with the blood vessels of the rectus muscle piece 142, may be moved or swung upward into position in the breast component 110 to create the mastectomy breast tissue piece 113. Accordingly, the teaching model 100 may be used to demonstrate what occurs during a Deep Inferior Epigastric Perforator (DIEP) flap procedure. In the DIEP flap procedure, blood vessels called deep inferior epigastric perforators (including skin and fat connected to these blood vessels) can be transferred from the lower abdomen to the chest in order to reconstruct a breast after mastectomy without the sacrifice of any of the abdominal muscles.

According to various embodiments of the present disclosure, a method of assembling an anatomical teaching model 100 for demonstrating and teaching the principals of breast and abdominal augmentation/reconstruction procedures may include providing the female-shaped torso 102 including a chest wall surface 104 and an abdominal wall surface 106. The method may further include removably attaching the pair of rectus muscle pieces 142, 144 to the abdominal wall surface 106. As described above, the pair of rectus muscle pieces 142, 144 may include two sections of material positionable symmetrically about a sagittal plane of the torso 102. The method may further include removably positioning the abdominal tissue piece 134 over the pair of rectus muscle pieces 142, 144 is such a manner that relative positions of the pair of rectus muscle pieces 142, 144 and the abdominal tissue piece 134 are manipulable to permit a clinician to demonstrate a female anatomy, a surgical procedure to the female anatomy, and/or a condition prompting or resulting from the surgical procedure. In some embodiments, at least one of the pair of rectus muscle pieces 142, 144 or the abdominal tissue piece 134 are removably attached to the female-shaped torso 102 using at least one fastener selected from the group consisting of a tethering fastener, a hook and loop fastener, a grommet fastener, a snap fastener, and a combination thereof.

As depicted in the various embodiments described herein, the method may further include removably attaching a pectoralis major muscle piece 116 to the chest wall surface 104 and removably attaching a breast tissue piece 112 over the pectoralis major muscle piece 116, wherein pectoralis major muscle piece 116 and the breast tissue piece 112 are repositionable relative to one another and relative to the torso. In some embodiments, at least one of the pectoralis major muscle piece 116 or the breast tissue piece 112 are removably attached to the torso 102 using at least one fastener selected from the group consisting of a hook and loop fastener, a grommet fastener, a snap fastener, and a combination thereof.

Figure 8B:
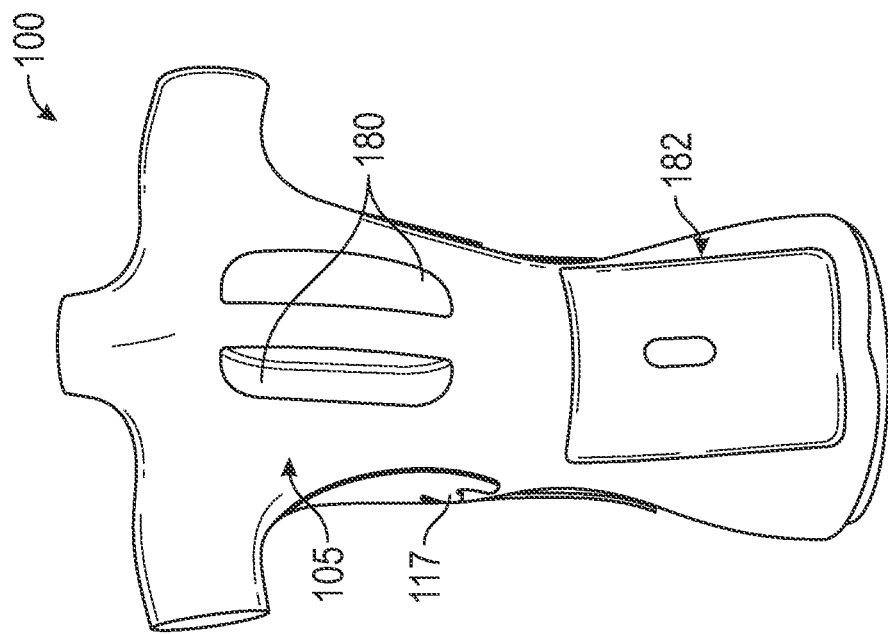
FIGS. 8A and 8B are back views of a breast and abdominal augmentation teaching model, in accordance with some embodiments of the present disclosure.
Figure 8A:
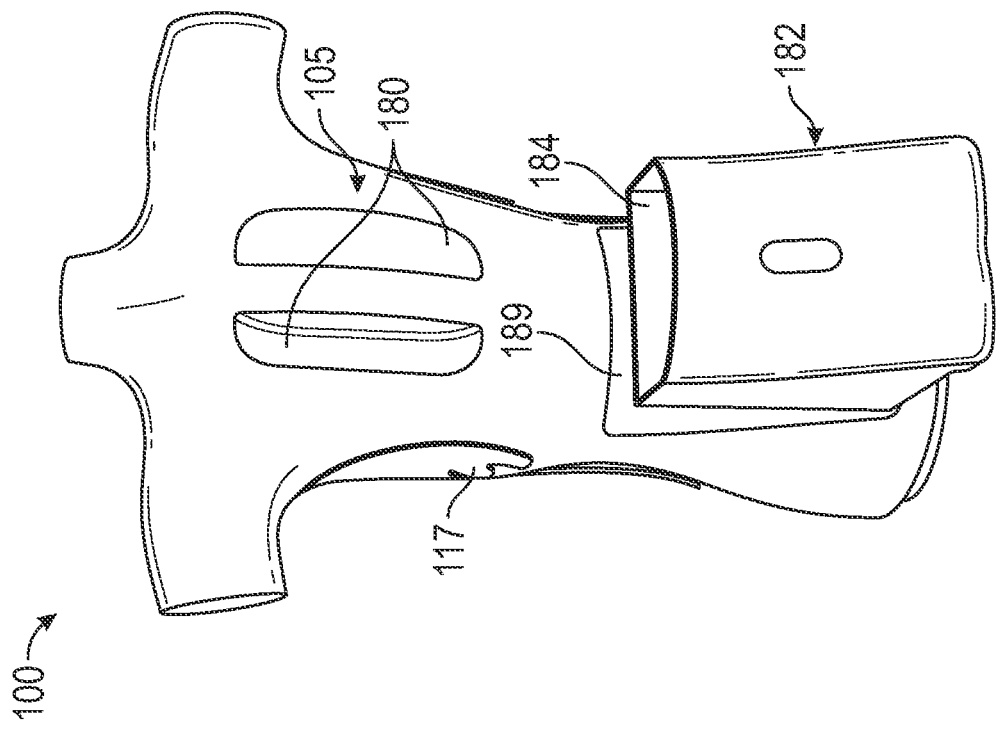

FIGS. 8A and 8B are rear views of a breast and abdominal augmentation teaching model, in accordance with some embodiments of the present disclosure. As depicted in FIGS.

8A and 8B, the teaching model 100 may include at least one container for storage of the components of the teaching model 100.

For example, as depicted, the teaching model may have a storage container or bin 182 positioned on a back side 105 of the teaching model 100. The storage container or bin 182 may have a cavity or compartment 184 in which least one of the breast tissue pieces 112 and 113, the pectoralis major muscle pieces 116, the pectoralis minor muscle pieces 118, the serratus muscle pieces 117, the paired rectus muscles 142, 144, the inframammary fold 121, the implant 120, and the abdominal tissue piece 134 may be conveniently stored. As illustrated in FIGS. 8A and 8B, the storage container or bin 182 may be removably housed in an internal cavity 189 of the teaching model 100.

In other embodiments, the storage container or bin 182 may tethered or otherwise attached to the back side 105 of the teaching model 100 so as to provide a storage space for the aforementioned components of the teaching model 100. As further illustrated, the teaching model 100 may include additional cavities 180 within the body of the teaching model 100 for further storage of components of the teaching model. For example, the cavities 180 may be provided for storage of the smaller components such as the pectoralis major muscle pieces 116, the pectoralis minor muscle pieces 118, the serratus muscle pieces 117, the paired rectus muscles 142, 144, the inframammary fold 121, and the plurality of fasteners as desired.

It can therefore be seen that the teaching model with the modifications described to include an abdominal teaching component, is an important tool that can improve both patient and physician education in breast augmentation and breast reconstruction and may lead to improved surgical outcomes and reduced reoperation rates. An improved educational experience may help patients become better informed and therefore better able to make informed consent. The breast implant and abdominal teaching model is designed as an educational tool to enhance the hands on teaching of plastic surgery residents, and young plastic surgeons. In addition, it advantageously provides a visual three-dimensional anatomic model for use during patient consultations for procedures including, but not limited to breast augmentation, breast reconstruction, breast implant revision or corrective procedures, breast reconstruction using autologous tissue from the abdomen, fat transfer procedures, the repair of abdominal hernias and soft tissue defects, as well as abdominoplasty procedures. The teaching model of the various embodiments described herein is an educational tool that helps create better informed and engaged patients: pre-operatively, post-operatively, and at every follow-up visit for years to come. For these reasons, the present disclosure represents a significant advancement in the art, which has substantial commercial merit.

Various examples of aspects of the disclosure are described as numbered clauses (1, 2, 3, etc.) for convenience. These are provided as examples and do not limit the subject technology. Identification of the figures and reference numbers are provided below merely as examples for illustrative purposes, and the clauses are not limited by those identifications.

Clause 1: An anatomical teaching model for demonstrating and teaching the principals of breast and/or abdominal surgical procedures, the anatomical model comprising: a female-shaped torso including a chest wall surface and an abdominal wall surface; a pectoralis major muscle piece attachable to the chest wall surface; a breast tissue piece positionable over the pectoralis major muscle piece, wherein relative positions of the pectoralis major muscle piece and of the breast tissue piece are manipulable to permit a clinician to demonstrate at least one of a female anatomy, a surgical procedure to the female anatomy, or a condition resulting from the surgical procedure; a pair of rectus muscle pieces attachable to the abdominal wall surface, the pair of rectus muscle pieces comprising two sections of material positionable symmetrically about a sagittal plane of the torso; and an abdominal tissue piece positionable over the pair of rectus muscle pieces, wherein relative positions of the pair of rectus muscle pieces and the abdominal tissue piece are manipulable to permit a clinician to demonstrate at least one of a female anatomy, a surgical procedure to the female anatomy, or a condition prompting or resulting from the surgical procedure.

Clause 2: The anatomical teaching model of Clause 1, wherein at least one of the pectoralis major muscle piece, the breast tissue piece, the pair of rectus muscle pieces, or the abdominal tissue piece are attached to the torso using at least one fastener selected from the group consisting of a hook and loop fastener, a grommet fastener, a snap fastener, and a combination thereof.

Clause 3: The anatomical teaching model of Clause 2, wherein at the least one fastener comprises a plurality of fasteners positioned along at least one of the sternal border, the clavicle, the axilla, the anterior axillary line, or a combination thereof.

Clause 4: The anatomical teaching model of Clause 2, wherein at the least one fastener comprises a tethering fastener.

Clause 5: The anatomical teaching model of any of the previous Clauses, wherein at least one of the pectoralis major muscle piece, the breast tissue piece, or the pair of rectus muscle pieces are formed of a stretchable fabric material.

Clause 6: The anatomical teaching model of any of the previous Clauses, wherein at least one of the pectoralis major muscle piece, the breast tissue piece, or the pair of rectus muscle pieces are formed of a synthetic material.

Clause 7: The anatomical teaching model of any of the previous Clauses, wherein pectoralis major muscle piece attaches to the chest wall surface at a plurality of positions.

Clause 8: The anatomical teaching model of any of the previous Clauses, further comprising at least one tether fastener to attach the pectoralis major muscle piece to the chest wall surface.

Clause 9: The anatomical teaching model of Clause 8, wherein the at least one tether fastener comprises an elastic string portion coupled to a lower portion of the pectoralis major muscle piece.

Clause 10: The anatomical teaching model of any of the previous Clauses, wherein the pectoralis major muscle piece is attached to the chest wall surface through a tethered fastening.

Clause 11: The anatomical teaching model of any of the previous Clauses, wherein the pectoralis major muscle piece and the breast tissue piece define a pocket interposed therebetween for placement of a breast implant.

Clause 12: The anatomical teaching model of any of the previous Clauses, further comprising a serratus muscles piece disposed on the chest wall surface and at least partially underneath the pectoralis major muscle piece.

Clause 13: The anatomical teaching model of Clause 12, wherein the serratus muscles piece is removably attachable to the chest wall surface at least partially underneath the pectoralis major muscle piece.

Clause 14: The anatomical teaching model of Clause 12, wherein the serratus muscles piece is painted, drawn or written on the chest wall surface.

Clause 15: The anatomical teaching model of any of the previous Clauses, further comprising a pectoralis minor muscle piece removably attachable to the chest wall surface underneath the pectoralis major muscle piece.

Clause 16: The anatomical teaching model of Clause 15, wherein at least one of the pectoralis minor muscle piece or the serratus muscles piece are removably attachable to the female-shaped torso using at least one fastener selected from the group consisting of a hook and loop fastener, a grommet fastener, a snap fastener, and a combination thereof.

Clause 17: The anatomical teaching model of any of the previous Clauses, further comprising inframammary fold element positioned on the chest wall between the pectoralis major muscle piece and the pair of rectus muscle pieces.

Clause 18: The anatomical teaching model of any of the previous Clauses, further comprising a capsule pocket configured to be inserted between the pectoralis major muscle piece and the chest wall surface, the capsule pocket having an opening for insertion of an implant.

Clause 19: The anatomical teaching model of any of the previous Clauses, wherein the breast tissue piece comprises an anterior fabric layer, a posterior fabric layer coupled to the anterior fabric layer, and a soft tissue filling disposed between the anterior and posterior fabric layers.

Clause 20: An anatomical teaching model for demonstrating and teaching the principals of abdominal surgical procedures, the anatomical model comprising: a female-shaped torso including a chest wall surface and an abdominal wall surface; a pair of rectus muscle pieces attachable to the abdominal wall surface, the pair of rectus muscle pieces symmetrically disposed about a central longitudinal axis of the abdominal wall surface; and an abdominal tissue piece attachable to the abdominal wall surface, wherein the pair of rectus muscle pieces attachable and the abdominal tissue piece are repositionable relative to one another on the female-shaped torso to demonstrate at least one of an anatomic condition or a surgical procedure.

Clause 21: The anatomical teaching model of Clause 20, wherein the abdominal tissue piece comprises an anterior fabric layer, a posterior fabric layer coupled to the anterior fabric layer, and a soft tissue filling disposed between the anterior and posterior fabric layers.

Clause 22: The anatomical teaching model of any of Clauses 20 to 21, wherein at least one of the pair of rectus muscle pieces or the abdominal tissue piece are removably attachable to the female-shaped torso using at least one fastener selected from the group consisting of a hook and loop fastener, a grommet fastener, a snap fastener, and a combination thereof.

Clause 23: The anatomical teaching model of any of Clauses 20 to 22, further comprising: a pectoralis major muscle piece attachable to the chest wall surface; and a breast tissue piece attachable to the pectoralis major muscle piece, wherein relative positions of the pectoralis major muscle piece and the breast tissue piece are manipulable to permit a clinician to demonstrate at least one of a female anatomy, a surgical procedure to the female anatomy, or a condition prompting or resulting from the surgical procedure.

Clause 24: The anatomical teaching model of Clause 23, wherein at least one of the pectoralis major muscle piece or the breast tissue piece are attached to the torso using at least one fastener selected from the group consisting of a hook and loop fastener, a grommet fastener, a snap fastener, and a combination thereof.

Clause 25: The anatomical teaching model of Clause 24, wherein the pectoralis major muscle piece is tethered at an inferior aspect thereof to the chest wall surface in order to demonstrate situations and complications routinely occurring as a result of breast implant surgery.

Clause 26: The anatomical teaching model of Clause 23, wherein the breast tissue piece attaches to the pectoralis major muscle piece.

Clause 27: The anatomical teaching model of Clause 26, wherein the breast tissue piece removably attaches to the pectoralis major muscle piece using at least one fastener selected from the group consisting of a hook and loop fastener, a grommet fastener, a snap fastener, and a combination thereof.

Clause 28: The anatomical teaching model of Clause 23, wherein the breast tissue piece attaches to the torso.

Clause 29: The anatomical teaching model of Clause 28, wherein the breast tissue piece removably attaches to the torso using at least one fastener selected from the group consisting of a hook and loop fastener, a grommet fastener, a snap fastener, and a combination thereof.

Clause 30: The anatomical model of any of the previous Clauses, wherein the abdominal tissue piece attaches to at least one of the pair of rectus muscle pieces.

Clause 31: The anatomical model of any of the previous Clauses, wherein the abdominal tissue piece attaches to at least one of the pair of rectus muscle pieces using at least one fastener selected from the group consisting of a hook and loop fastener, a grommet fastener, a snap fastener, and a combination thereof.

Clause 32: A method of assembling an anatomical teaching model for demonstrating and teaching the principals of breast and abdominal augmentation/reconstruction procedures comprising providing a female-shaped torso including a chest wall surface and an abdominal wall surface; removably attaching a pair of rectus muscle pieces over the abdominal wall surface, the pair of rectus muscle pieces comprising two sections of material positionable symmetrically about a sagittal plane of the torso; and removably attaching an abdominal tissue piece to the pair of rectus muscle pieces, wherein relative positions of the pair of rectus muscle pieces and the abdominal tissue piece are manipulable to permit a clinician to demonstrate at least one of a female anatomy, a surgical procedure to the female anatomy, or a condition prompting or resulting from the surgical procedure.

Clause 33: The method of Clause 32, wherein at least one of the pair of rectus muscle pieces or the abdominal tissue piece are removably attached to the female-shaped torso using at least one fastener selected from the group consisting of a hook and loop fastener, a grommet fastener, a snap fastener, and a combination thereof.

Clause 34: The method of any of Clauses 32 to 33, further comprising: removably attaching a pectoralis major muscle piece to the chest wall surface; and removably attaching a breast tissue piece over the pectoralis major muscle piece, wherein pectoralis major muscle piece and the breast tissue piece are repositionable relative to one another and relative to the torso.

Clause 35: The method of Clause 34, wherein at least one of the pectoralis major muscle piece or the breast tissue piece are removably attached to the torso using at least one fastener selected from the group consisting of a tethering fastener, a hook and loop fastener, a grommet fastener, a snap fastener, and a combination thereof.

Clause 36: An anatomical teaching model for demonstrating and teaching the principals of abdominal surgical procedures, the anatomical model comprising any of the features recited in any of the previous Clauses.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the embodiments disclosed herein.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An anatomical teaching model for demonstrating and teaching principles of breast and/or abdominal surgical procedures, the anatomical teaching model comprising:
    a torso including a chest wall surface and an abdominal wall surface;
    a pair of rectus muscle pieces removably attachable to the abdominal wall surface, the pair of rectus muscle pieces comprising two sections of material positionable symmetrically about a sagittal plane of the torso; and
    an abdominal tissue piece removably attachable over the pair of rectus muscle pieces, wherein relative positions of the pair of rectus muscle pieces and the abdominal tissue piece are manipulable.

2. The anatomical teaching model of claim 1, further comprising:
    a pectoralis major muscle piece attachable to the chest wall surface; and
    a breast tissue piece attachable to the pectoralis major muscle piece,
    wherein the pectoralis major muscle piece and the breast tissue piece define a pocket interposed therebetween for placement of a breast implant.

3. The anatomical teaching model of claim 1, further comprising a pectoralis minor muscle piece removably attachable to the chest wall surface underneath the pectoralis major muscle piece.

4. The anatomical teaching model of claim 2, further comprising a pectoralis minor muscle piece removably attachable to the chest wall surface underneath the pectoralis major muscle piece.

5. The anatomical teaching model of claim 3, further comprising a serratus muscle piece attachable to the chest wall surface and at least partially underneath the pectoralis major muscle piece.

6. The anatomical teaching model of claim 4, further comprising a serratus muscle piece attachable to the chest wall surface and at least partially underneath the pectoralis major muscle piece.

7. The anatomical teaching model of claim 1, further comprising an inframammary fold element positioned on the chest wall surface between the pectoralis major muscle piece and the pair of rectus muscle pieces.

8. The anatomical teaching model of claim 1, further comprising a capsule pocket configured to be inserted between the pectoralis major muscle piece and the chest wall surface, the capsule pocket having an opening for insertion of an implant.

9. The anatomical teaching model of claim 1 further comprising an abdominal tissue piece removably attachable to the abdominal wall surface,
    wherein the pair of rectus muscle pieces and the abdominal tissue piece are repositionable relative to one another on the torso.

10. An anatomical teaching model for demonstrating and teaching principles of breast surgical procedures, the anatomical teaching model comprising:
    a torso including a chest wall surface and an abdominal wall surface;

a pectoralis major muscle piece attachable to the chest wall surface; and a capsule pocket configured to be inserted between the pectoralis major muscle piece and the chest wall surface, the capsule pocket having an opening for insertion of an implant.

11. The anatomical teaching model of claim 10, further comprising:

a pectoralis major muscle piece attachable to the chest wall surface; and a breast tissue piece attachable to the pectoralis major muscle piece, wherein relative positions of the pectoralis major muscle piece and the breast tissue piece are manipulable.

12. The anatomical teaching model of claim 11, wherein at least one of the pectoralis major muscle piece or the breast tissue piece are affixed to the torso using at least one fastener selected from the group consisting of a hook and loop fastener, a grommet fastener, a snap fastener, and a combination thereof.

13. The anatomical teaching model of claim 12, wherein the pectoralis major muscle piece is tethered at an inferior aspect thereof to the chest wall surface in order to demonstrate situations and complications routinely occurring as a result of breast implant surgery.

* * * * *